United States Patent
Yang et al.

(10) Patent No.: US 12,386,463 B2
(45) Date of Patent: Aug. 12, 2025

(54) TOUCH SENSING UNIT AND DISPLAY DEVICE INCLUDING THE SAME

(71) Applicant: Samsung Display Co., Ltd., Yongin-si (KR)

(72) Inventors: Sung Jin Yang, Cheonan-si (KR); Tae Ik Kim, Asan-si (KR); Hyun Sik Park, Cheonan-si (KR); Chun Gi You, Asan-si (KR); Sung Ho Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/206,588

(22) Filed: Jun. 6, 2023

(65) Prior Publication Data

US 2023/0315236 A1    Oct. 5, 2023

Related U.S. Application Data

(60) Continuation of application No. 17/827,791, filed on May 30, 2022, now Pat. No. 11,687,199, which is a
(Continued)

(30) Foreign Application Priority Data

Nov. 16, 2018    (KR) .................. 10-2018-0141703

(51) Int. Cl.
*G06F 3/041*    (2006.01)
*G06F 3/044*    (2006.01)

(52) U.S. Cl.
CPC ............ *G06F 3/044* (2013.01); *G06F 3/0412* (2013.01); *G06F 2203/04111* (2013.01)

(58) Field of Classification Search
CPC .... G06F 3/041; G06F 3/0412; G06F 3/04164; G06F 3/044; G06F 3/0448;
(Continued)

(56) References Cited

U.S. PATENT DOCUMENTS 9,137,882 B2    9/2015 Yoo et al.
9,857,906 B2    1/2018 Park et al.
(Continued)

FOREIGN PATENT DOCUMENTS

CN    103092394    5/2013
CN    103970340    8/2014
(Continued)

OTHER PUBLICATIONS

Korean Office Action dated Oct. 11, 2023, in Korean Patent Application No. 10-2018-0141703 (with English translation).
(Continued)

*Primary Examiner* — Ryan A Lubit
(74) *Attorney, Agent, or Firm* — Womble Bond Dickinson (US) LLP

(57) ABSTRACT

A touch sensing unit includes first touch electrodes, a first touch signal line, and a second touch signal line. The first touch electrodes are disposed in a touch sensor area. The first touch signal line is electrically connected to some of the first touch electrodes arranged in a first column. The second touch signal line is electrically connected to some of the first touch electrodes arranged in a second column different from the first column. The second touch signal line includes a first bent portion bent at least once in an intersection region of the first touch signal line and the second touch signal line.

20 Claims, 28 Drawing Sheets

Related U.S. Application Data division of application No. 17/195,378, filed on Mar. 8, 2021, now Pat. No. 11,347,356, which is a continuation of application No. 16/551,227, filed on Aug. 26, 2019, now Pat. No. 10,942,609.

(58) Field of Classification Search
CPC .. G06F 2203/04103; G06F 2203/04111; G06F 2203/04112
See application file for complete search history.

(56) References Cited

U.S. PATENT DOCUMENTS

| | | | |
|---|---|---|---|
| 10,152,147 B2 | 12/2018 | Choi et al. | |
| 10,234,980 B2 | 3/2019 | Seong et al. | |
| 10,282,043 B2 | 5/2019 | Kim et al. | |
| 10,488,983 B2 | 11/2019 | Zhang | |
| 10,606,390 B2 | 3/2020 | Tanaka et al. | |
| 10,698,523 B2 | 6/2020 | Jang et al. | |
| 11,036,340 B2 | 6/2021 | Kwak et al. | |
| 2010/0085326 A1 | 4/2010 | Anno | |
| 2011/0057893 A1 | 3/2011 | Kim et al. | |
| 2013/0106747 A1 | 5/2013 | Choi et al. | |
| 2013/0191804 A1 | 7/2013 | Bytheway et al. | |
| 2014/0182894 A1 | 7/2014 | Liu et al. | |
| 2014/0253498 A1 | 9/2014 | Suzuki et al. | |
| 2015/0185903 A1 | 7/2015 | Park | |
| 2016/0054836 A1* | 2/2016 | Wu | G06F 3/0446 345/173 |
| 2016/0111040 A1* | 4/2016 | Kim | H10D 86/60 257/773 |
| 2016/0154499 A1 | 6/2016 | Bae et al. | |
| 2017/0285802 A1* | 10/2017 | Ishizaki | G06F 3/0446 |
| 2018/0224962 A1* | 8/2018 | Mori | G06F 3/0446 |
| 2019/0004653 A1* | 1/2019 | Won | H10K 59/40 |
| 2019/0034012 A1 | 1/2019 | Xie et al. | |
| 2019/0034014 A1* | 1/2019 | Wu | G06F 3/0446 |
| 2019/0035860 A1* | 1/2019 | Oh | H10K 59/122 |
| 2019/0079625 A1* | 3/2019 | Wang | G09G 3/20 |
| 2019/0220123 A1* | 7/2019 | Kanaya | H10K 59/40 |
| 2019/0235668 A1* | 8/2019 | Ye | G06F 3/04164 |
| 2019/0286272 A1* | 9/2019 | Feng | G06F 3/0412 |
| 2019/0304999 A1* | 10/2019 | Wang | H10D 86/60 |
| 2020/0019294 A1* | 1/2020 | Lee | G06F 3/0412 |

FOREIGN PATENT DOCUMENTS

| | | |
|---|---|---|
| CN | 104793783 | 7/2015 |
| CN | 105824473 | 8/2016 |
| CN | 106068493 | 11/2016 |
| CN | 106468972 | 3/2017 |
| CN | 107065269 | 8/2017 |
| CN | 107527932 | 12/2017 |
| CN | 107665910 | 2/2018 |
| JP | 2018-077777 | 5/2018 |
| KR | 10-2010-0054899 | 5/2010 |
| KR | 10-2011-0025374 | 3/2011 |
| KR | 10-2013-0046263 | 5/2013 |
| KR | 10-2013-0118179 | 10/2013 |
| KR | 10-2015-0106085 | 9/2015 |
| KR | 10-2016-0015110 | 2/2016 |
| KR | 10-2016-0043697 | 4/2016 |

OTHER PUBLICATIONS

Notice of Allowance dated Nov. 4, 2020, in U.S. Appl. No. 16/551,227 (submitted in parent appl.).
Non-Final Office Action dated Jun. 29, 2020, in U.S. Appl. No. 16/551,227 (submitted in parent appl.).
Notice of Allowance dated Jan. 31, 2022, in U.S. Appl. No. 17/195,378 (submitted in parent appl.).
Notice of Allowance dated Feb. 14, 2023, in U.S. Appl. No. 17/827,791.

* cited by examiner

TOUCH SENSING UNIT AND DISPLAY DEVICE INCLUDING THE SAME

CROSS-REFERENCE TO RELATED APPLICATIONS

This application is a Continuation of U.S. patent application Ser. No. 17/827,791, filed on May 30, 2022, which is a Divisional of U.S. patent application Ser. No. 17/195,378, filed Mar. 8, 2021, issued as U.S. Pat. No. 11,347,356, which is a Continuation of U.S. patent application Ser. No. 16/551,227, filed Aug. 26, 2019, which issued as U.S. Pat. No. 10,942,609, which claims priority to and the benefit of Korean Patent Application No. 10-2018-0141703, filed Nov. 16, 2018, each of which is hereby incorporated by reference for all purposes as if fully set forth herein.

BACKGROUND

Field

Embodiments generally relate to a touch sensing unit and a display device including the same.

Discussion

A display device for displaying an image may be used for various electronic appliances for providing an image to a user, such as smart phones, tablet personal computers (PCs), digital cameras, notebook computers, navigators, televisions, etc. The display device may include a display panel for generating and displaying an image, as well as include various input devices. For instance, in the fields of smart phones and tablet PCs, a touch sensing unit for recognizing a touch input (or interaction) has been used as an input device for a display device. The touch sensing unit may determine whether a user's touch (or near touch, e.g., hovering action) is input, and may determine (e.g., calculate) the corresponding position as touch input coordinates.

The touch sensing unit may include first touch electrodes electrically connected in a first direction, second touch electrodes electrically connected in a second direction intersecting the first direction, first touch lines connected to the first touch electrodes, and second touch lines connected to the second touch electrodes. In this case, the first touch lines may be (or become) disconnected in an area where the first touch lines are formed at high density, and thus, the touch sensing unit may be disabled.

The above information disclosed in this section is only for understanding the background of the inventive concepts, and, therefore, may contain information that does not form prior art.

SUMMARY

A touch sensing unit constructed according to the principles and embodiments of the invention is capable of preventing (or reducing the likelihood of) touch signal lines from being disconnected even when the touch signal lines are formed at high density.

A display device including a touch sensing unit constructed according to the principles and embodiments of the invention is capable of preventing (or reducing the likelihood of) touch signal lines from being disconnected even when the touch signal lines are formed at high density.

Additional aspects/features will be set forth in the detailed description which follows, and, in part, will be apparent from the disclosure, or may be learned by practice of the inventive concepts.

According to some embodiments, a touch sensing unit includes first touch electrodes, a first touch signal line, and a second touch signal line. The first touch electrodes are disposed in a touch sensor area. The first touch signal line is electrically connected to some of the first touch electrodes arranged in a first column. The second touch signal line is electrically connected to some of the first touch electrodes arranged in a second column different from the first column. The second touch signal line includes a first bent portion bent at least once in an intersection region of the first touch signal line and the second touch signal line.

According to some embodiments, a touch sensing unit includes first touch electrodes, a first touch signal line, and a second touch signal line. The first touch electrodes are disposed in a touch sensor area. The first touch signal line is electrically connected to first touch electrodes arranged in a first column among the first touch electrodes. The second touch signal line is electrically connected to first touch electrodes arranged in a second column among the first touch electrodes. The second column is different from the first column. The first touch signal line includes a first connection line overlapping the second touch signal line in an intersection region of the first touch signal line and the second touch signal line.

According to some embodiments, a display device includes a display area and a touch sensor area overlapping the display area. The display area includes pixels. The touch sensor area includes first touch electrodes, a first touch signal line, and a second touch signal line. The first touch electrodes are disposed in the touch sensor area. The first touch signal line is electrically connected to some of the first touch electrodes arranged in a first column. The second touch signal line is electrically connected to some of the first touch electrodes arranged in a second column different from the first column. The second touch signal line includes a first bent portion bent at least once in an intersection region of the first touch signal line and the second touch signal line.

According to some embodiments, a touch sensing unit includes first and second touch electrodes disposed in a first touch sensor area, a second touch sensor area protruding from one side of the first touch sensor area in a first direction, and a third touch sensor area protruding from the one side of the first touch sensor area in the first direction, wherein the first touch electrodes are disposed in a first direction in each of a plurality of columns, and the second touch electrode are disposed in a second direction intersecting the first direction in each of a plurality of rows, and a first connection line connected to a second touch electrode of the second touch sensor area and a second touch electrode of the third touch sensor area.

The touch sensing unit may include an area between the second touch sensor area and the third touch sensor area in the second direction.

The first touch sensor area may be larger than an area of the second touch sensor area, and wherein the first touch sensor area may be larger than an area of the third touch sensor area.

The first and second touch electrodes may not be disposed in the area.

The first connection line may be disposed in an area between the second touch sensor area and the third touch sensor area.

The second touch electrode of the second touch sensor area may be adjacent to a first side of the second touch sensor area which is opposite to the third touch sensor area in the second direction, and wherein the second touch electrode of the third touch sensor area may be adjacent to a first side of the third touch sensor area which is opposite to the second touch sensor area in the second direction.

The first connection line may be disposed in a different layer from the first touch electrodes and the second touch electrodes.

The touch sensing unit may further include first touch signal lines connected to the first touch electrode disposed at one side of the columns, respectively, and second touch signal lines connected to the second touch electrodes disposed at one side of the rows, respectively.

The first connection line may be disposed in a same layer as the first touch signal lines and second touch signal lines.

The touch sensing unit may further include a substrate on which the first touch signal lines, the second touch signal lines, and the first connection line may be disposed, and a first insulating film may be disposed on the first touch signal lines, the second touch signal lines, and the first connection line, wherein the first touch electrodes and the second touch electrodes may be disposed on the first insulating film.

The maximum widths of the second touch signal lines may be different from each other.

The maximum widths of the second touch signal lines may decrease as the second touch signal lines become closer to the first touch sensor area.

A first maximum width of a first sub touch line adjacent to the first touch sensor area among the second touch signal lines may be smaller than a second maximum width of a second sub touch line adjacent to an edge of the substrate among the second touch signal lines.

A length of the first sub touch line may be longer than a length of the second sub touch line.

A third maximum width of a third sub touch line between the first sub touch line and the second sub touch line in the second direction may be greater than the first maximum width and less than the second maximum width.

A length of the third sub touch line may be longer than a length of the first sub touch line and less than a length of the second sub touch line.

The touch sensing unit may further include a guard line between the first touch sensor area and a first sub touch line adjacent to the first touch sensor area among the second touch signal lines.

The guard line may be between the first sub touch line and one of the first touch sensing lines.

A ground voltage may be applied to the guard line.

The second touch sensor area may protrude from one edge of one side of the first touch sensor area, and the third touch sensor area protrudes from another edge of the one side of the first touch sensor area.

The foregoing general description and the following detailed description are illustrative and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

DETAILED DESCRIPTION OF THE ILLUSTRATED EMBODIMENTS

Figure 1:
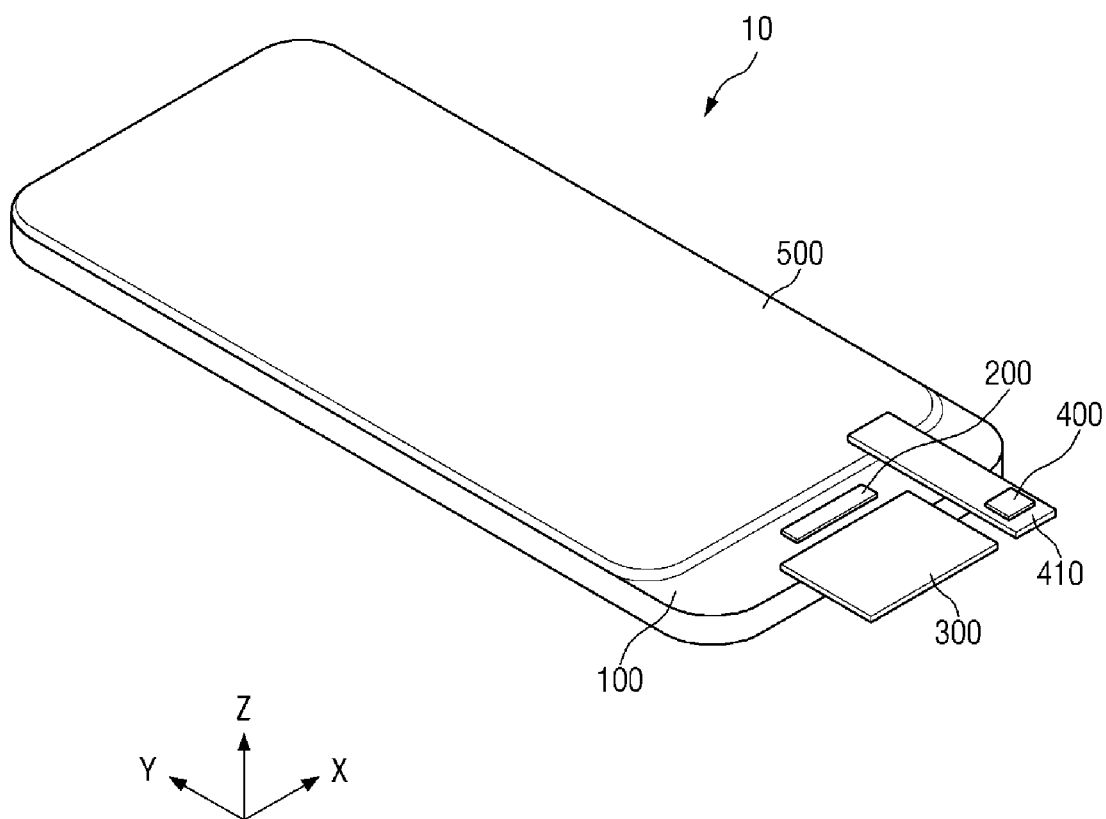
FIG. 1 is a perspective view of a display device according to some embodiments.

In the following description, for the purposes of explanation, numerous specific details are set forth in order to provide a thorough understanding of various embodiments. As used herein, the terms "embodiments" and "implementations" are used interchangeably and are non-limiting examples employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the X-axis, the Y-axis, and the Z-axis are not limited to three axes of a rectangular coordinate system, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the illustrative term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional views, isometric views, perspective views, plan views, and/or exploded illustrations that are schematic illustrations of idealized embodiments and/or intermediate structures. As such, variations from the shapes of the illustrations as a result of, for example, manufacturing techniques and/or tolerances, are to be expected. Thus, embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, various embodiments will be explained in detail with reference to the accompanying drawings.

Figure 2:
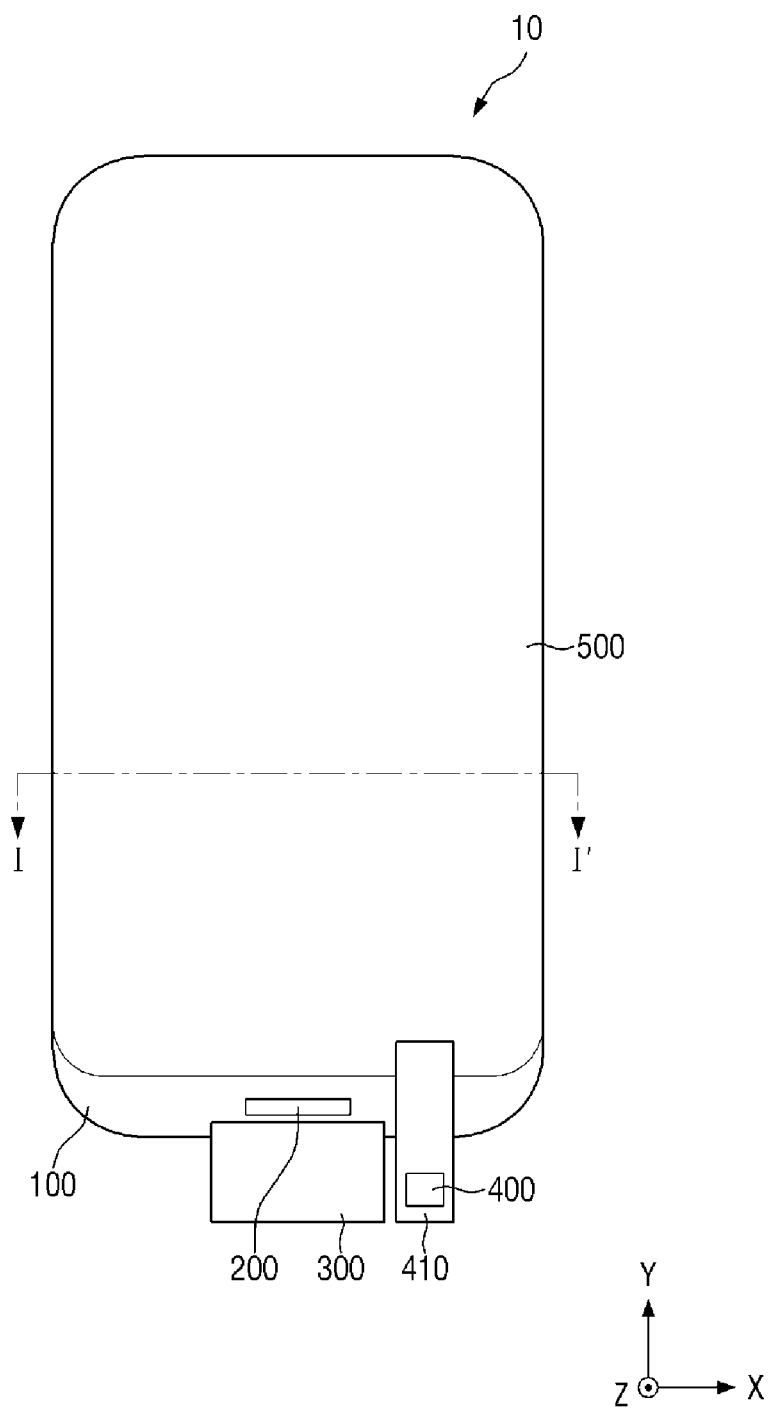
FIG. 2 is a plan view of a display device according to some embodiments.

FIG. 1 is a perspective view of a display device according to some embodiments. FIG. 2 is a plan view of a display device according to some embodiments.

For the purposes of this disclosure, the terms "on," "over," "top," "upper side," and "upper surface" refer to a direction in which a touch sensing unit (or touch sensing structure) 500 is disposed, that is, a Z-axis direction, with respect to a display panel 100, and the terms "beneath," "under," "bottom," "lower side," and "lower surface" refer to a direction in which the display panel 100 is disposed, that is, a direction opposite to the Z-axis direction, with respect to the touch sensing unit 500. Further, the terms "left," "right," "upper," and "lower" refer to directions when the display panel 100 is viewed from a plane, e.g., a plane parallel to a plane defined by the X-axis direction and the Y-axis direction. For example, the "left" refers to a direction opposite the X-axis direction, the "right" refers to the X-axis direction, the "upper" refers to the Y-axis direction, and the "lower" refers to a direction opposite the Y-axis direction.

Referring to FIGS. 1 and 2, a display device 10 is a device for displaying a moving image and/or a still image. The display device 10 may be used as a display screen for various products, such as televisions, notebooks, monitors, billboards, internet of things devices, etc., as well as portable electronic appliances, such as mobile phones, smart phones, tablet personal computers (PCs), smart watches, watch phones, mobile communication terminals, electronic notebooks, electronic books, portable multimedia players (PMPs), navigators, ultra-mobile PCs (UMPs), and the like. The display device 10 may be any one of an organic light emitting display device, a liquid crystal display device, a plasma display device, a field emission display device, an electrophoretic display device, an electrowetting display device, a quantum dot emission display device, and a micro light emitting diode (LED) display device. Hereinafter, the display device 10 will be described assuming that the display device 10 is an organic light emitting display device, but embodiments are not limited thereto.

The display device 10 according to some embodiments includes a display panel 100, a display driving circuit 200, a display circuit board 300, a touch driving circuit 400, a touch circuit board 410, and a touch sensing unit 500.

The display panel 100 may have a rectangular planar shape having short sides in the first direction (X-axis direction) and long sides in the second direction (Y-axis direction). The corner where the short side in the first direction (X-axis direction) meets the long side in the second direction (Y-axis direction) may be formed to have a round shape of a predetermined curvature, a right angle shape, or some other geometric configuration. The planar shape of the display panel 100 is not limited to a rectangular shape, and may be formed in another polygonal shape, circular shape, or elliptical shape.

The display panel 100 may be formed to be flat, but is not limited thereto, and may include a curved portion formed at, for instance, left and right ends. In this case, the curved portion may have a constant curvature or a variable curvature. Further, the display panel 100 may be formed to be flexible such that it is (or can be) intentionally bent, unbent, warped, unwarped, folded, unfolded, rolled, and/or unrolled.

As will become more apparent below, the display panel 100 may include pixels disposed in a display area and displaying an image, and display electrode pads disposed in a non-display area, which may be outside (e.g., around) the display area. The display electrode pads may be formed on the display panel 100 at one side edge of the display panel 100 and electrically connected to the display circuit board 300. More details of the display panel 100 will be described later with reference to FIGS. 3 and 4.

The display driving circuit 200 outputs signals and voltages for driving the display panel 100. For example, the display driving circuit 200 may supply data voltages to data lines. Further, the display driving circuit 200 may supply power supply voltages to power supply lines and may supply scan control signals to a scan driving unit. The display driving circuit 200 may be formed of an integrated circuit (IC) and attached onto the display panel 100 by a chip-on-glass (COG) method, a chip-on-plastic (COP) method, or an ultrasonic bonding method; however, embodiments are not limited thereto. The display driving circuit 200 may be attached onto an exposed portion of the display panel 100 without being covered by the touch sensing unit 500. Alternatively, the display driving circuit 200 may be mounted on the display circuit board 300 or any other suitable component of the display device 10.

The display circuit board 300 may be attached onto the display electrode pads of the display panel 100 using an anisotropic conductive film. Thus, the lead lines of the display circuit board 300 may be electrically connected to the display electrode pads of the display panel 100. The display circuit board 300 may be a flexible printed circuit board, a printed circuit board, or a flexible film, such as a chip-on film.

The touch sensing unit 500 may be disposed on the display panel 100. The touch sensing unit 500 may have a rectangular planar shape having short sides in the first direction (X-axis direction) and long sides in the second direction (Y-axis direction). The corner where the short side in the first direction (X-axis direction) meets the long side in the second direction (Y-axis direction) may be formed to have a round shape of a predetermined curvature, a right angle shape, or any other suitable geometric configuration. The planar shape of the touch sensing unit 500 is not limited to a rectangular shape, and may be formed in another polygonal shape, circular shape, or elliptical shape. In some embodiments, the planar shape of the touch sensing unit 500 may be similar to the planar shape of the display panel 100.

The touch sensing unit 500 may be formed to be flat, but is not limited thereto, and may include a curved portion formed at, for instance, left and right ends. In this case, the curved portion may have a constant curvature or a variable curvature. Further, the touch sensing unit 500, like the display panel 100, may be formed to be flexible such that it is (or can be) intentionally bent, unbent, warped, unwarped, folded, unfolded, rolled, and/or unrolled.

As will become more apparent below, the touch sensing unit 500 may include touch electrodes disposed in a touch sensor area and sensing a user's touch, and touch electrode pads disposed in a touch peripheral area, which may be outside (e.g., around) the touch sensor area. The touch electrode pads may be formed on the touch sensing unit 500 at one side edge of the touch sensing unit 500 and electrically connected to the touch circuit board 410.

Details of the touch sensing unit 500 will be described later with reference to FIGS. 3 and 5. Although it is illustrated in FIGS. 1 and 2 that the touch sensing unit 500 is a separate touch panel that is separated from the display panel 100, embodiments are not limited thereto. For instance, as shown in at least FIGS. 25 and 26, the touch sensing unit 500 may be formed directly on a thin film encapsulation layer of the display panel 100. Details thereof will be described later with reference to FIGS. 25 to 28.

The touch circuit board 410 may be attached onto the touch electrode pads of the touch sensing unit 500 using an anisotropic conductive film. Accordingly, the lead lines of the touch circuit board 410 may be electrically connected to the touch electrode pads of the touch sensing unit 500. The touch circuit board 410 may be a flexible printed circuit board, a printed circuit board, or a flexible film, such as a chip-on film.

The touch driving circuit 400 may be connected to the touch electrodes of the touch sensing unit 500. The touch driving circuit 400 applies touch driving signals to the touch electrodes of the touch sensing unit 500 and measures capacitance values of the touch electrodes. The touch driving signal may be a signal having a plurality of driving pulses. The touch driving circuit 400 may determine whether or not a touch input (or interaction) is performed depending on the capacitance values, and may also determine (e.g., calculate) touch coordinates at which a touch interaction is input. The touch driving circuit 400 may be formed of an integrated circuit (IC) and mounted on the touch circuit board 410.

Figure 3:
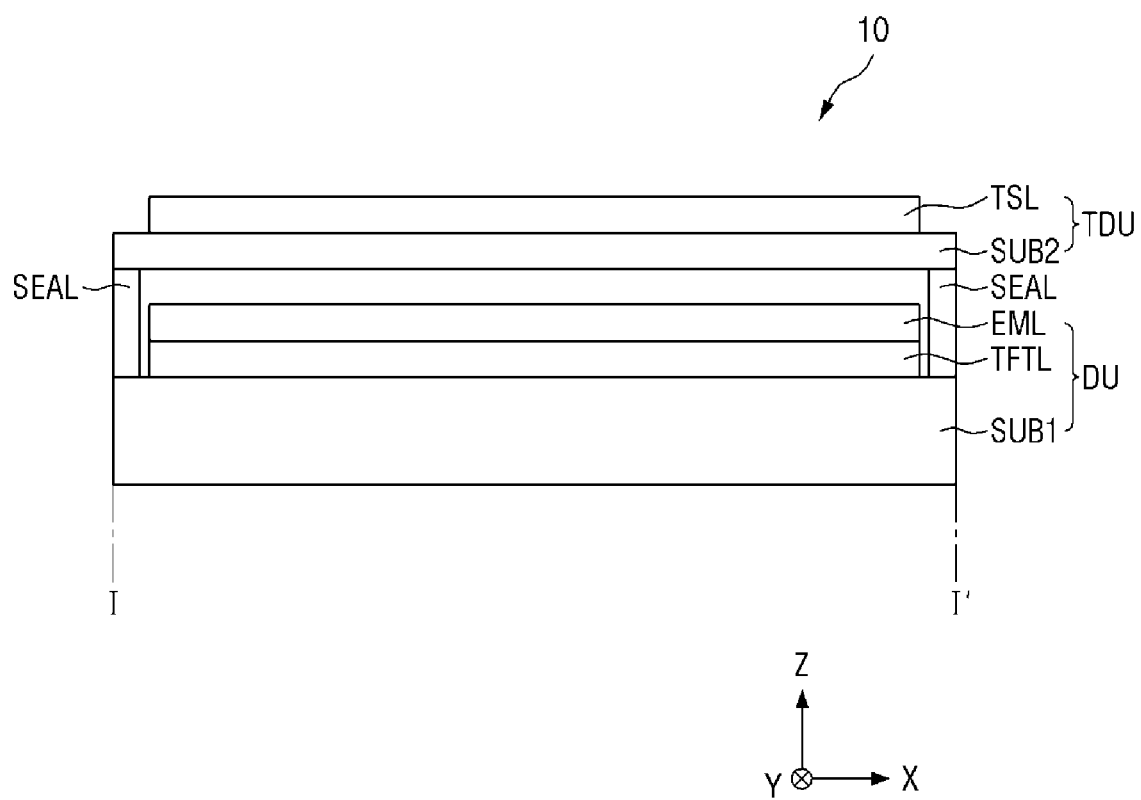
FIG. 3 is an example of a cross-sectional view taken along sectional line I-I' of FIG. 2 according to some embodiments.

FIG. 3 is an example of a cross-sectional view taken along sectional line I-I' of FIG. 2 according to some embodiments.

Referring to FIG. 3, the display device 10 may include a display unit DU, a touch sensing unit TDU, and an adhesive member SEAL for bonding the display unit DU and the touch sensing unit TDU.

The display unit DU may include a first substrate SUB1, a thin film transistor layer TFTL, and a light emitting element layer EML.

The first substrate SUB1 may be a rigid substrate or may be a flexible substrate capable of bending, folding, rolling, and/or the like. The first substrate SUB1 may be made of an insulating material, such as glass, quartz, and/or a polymer resin. Examples of the polymer resin may include polyethersulfone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CTA or TAC), cellulose acetate propionate (CAP), and/or combinations thereof. Alternatively (or additionally), the first substrate SUB1 may include a metal material.

Figure 4:
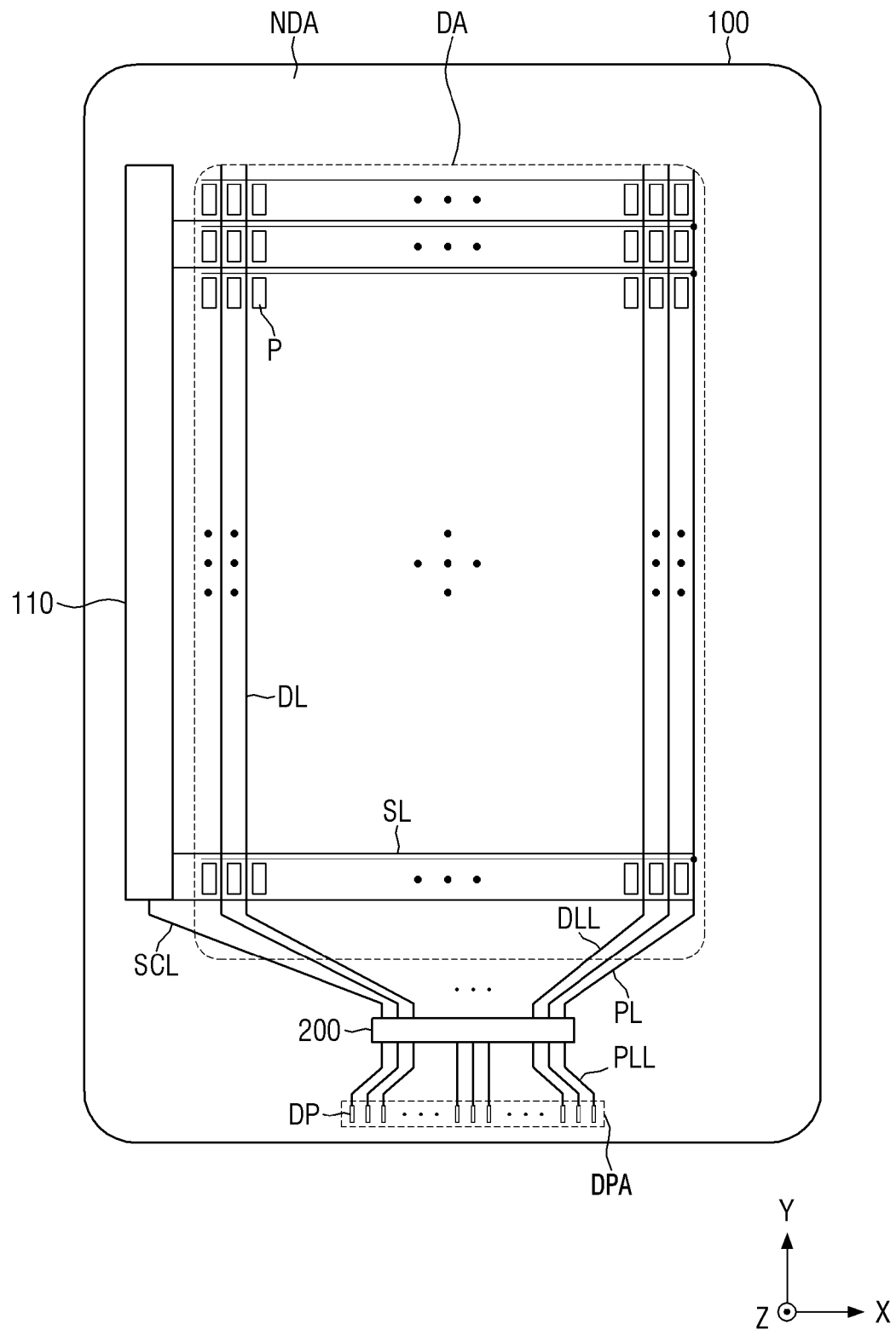
FIG. 4 is a plan view showing an example of the display unit of FIG. 3 according to some embodiments.

The thin film transistor layer TFTL may be disposed on the first substrate SUB1. As will become more apparent below, the thin film transistor layer TFTL may be provided with not only thin film transistors of each pixel, but also scan lines, data lines, power supply lines, scan control lines, data connection lines for connecting the display driving circuit 200 and data lines, and pad connection lines for connecting the display driving circuit 200 and display electrode pads. Each of the thin film transistors may include a gate electrode, a semiconductor layer, a source electrode, and a drain electrode. When a scan driving unit 110 is formed in a non-display area NDA of the display panel 100 as shown in FIG. 4, the scan driving unit 110 may include thin film transistors.

The thin film transistor layer TFTL may be disposed in the display area DA and the non-display area NDA. For example, thin film transistors, scan lines, data lines, and power supply lines of each pixel of the thin film transistor layer TFTL may be disposed in the display area DA. Further, scan control lines, data connection lines, and pad connection lines of the thin film transistor layer TFTL may be disposed in the non-display area NDA.

The light emitting element layer EML may be disposed on the thin film transistor layer TFTL. As will become more apparent below, the light emitting element layer EML may include pixels, each of which may include a first electrode, a light emitting layer, and a second electrode sequentially laminated, and a pixel defining film defining the pixels. The pixels of the light emitting element layer EML may be disposed in the display area DA.

The light emitting layer may be an electroluminescent layer, such as organic light emitting layer including an organic material. In this case, the light emitting layer may include a hole transporting layer, an organic light emitting layer, and an electron transporting layer. When a predetermined voltage is applied to the first electrode through the thin film transistor of the thin film transistor layer TFTL and a cathode voltage is applied to the second electrode, holes and electrons are transferred to the organic light emitting layer through the hole transporting layer and the electron transporting layer, respectively, and are combined with each other to emit light. In this case, the first electrode may be an anode electrode, and the second electrode may be a cathode electrode, but embodiments are not limited to such a configuration.

The touch sensing unit TDU may include a second substrate SUB2 and a touch sensor layer TSL.

The second substrate SUB2 may be a rigid substrate or may be a flexible substrate capable of bending, folding, rolling, and/or the like. The second substrate SUB2 may be made of an insulating material, such as glass, quartz, and/or a polymer resin. Examples of the polymer resin may include polyethersulfone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CTA or TAC), cellulose acetate propionate (CAP), and/or combinations thereof. Alternatively (or additionally), the second substrate SUB2 may include a metal material. Further, the second substrate SUB2 may serve as an encapsulation substrate for encapsulating the light emitting element layer EML.

The touch sensor layer TSL may be disposed on the second substrate SUB2. The touch sensor layer TSL may include touch electrodes for sensing a user's touch by a capacitance method, touch electrode pads, and touch signal lines for connecting the touch electrode pads and the touch electrodes. For example, the touch sensor layer TSL may sense a user's touch by a self-capacitance method and/or a mutual capacitance method, but embodiments are not limited thereto.

Figure 5:
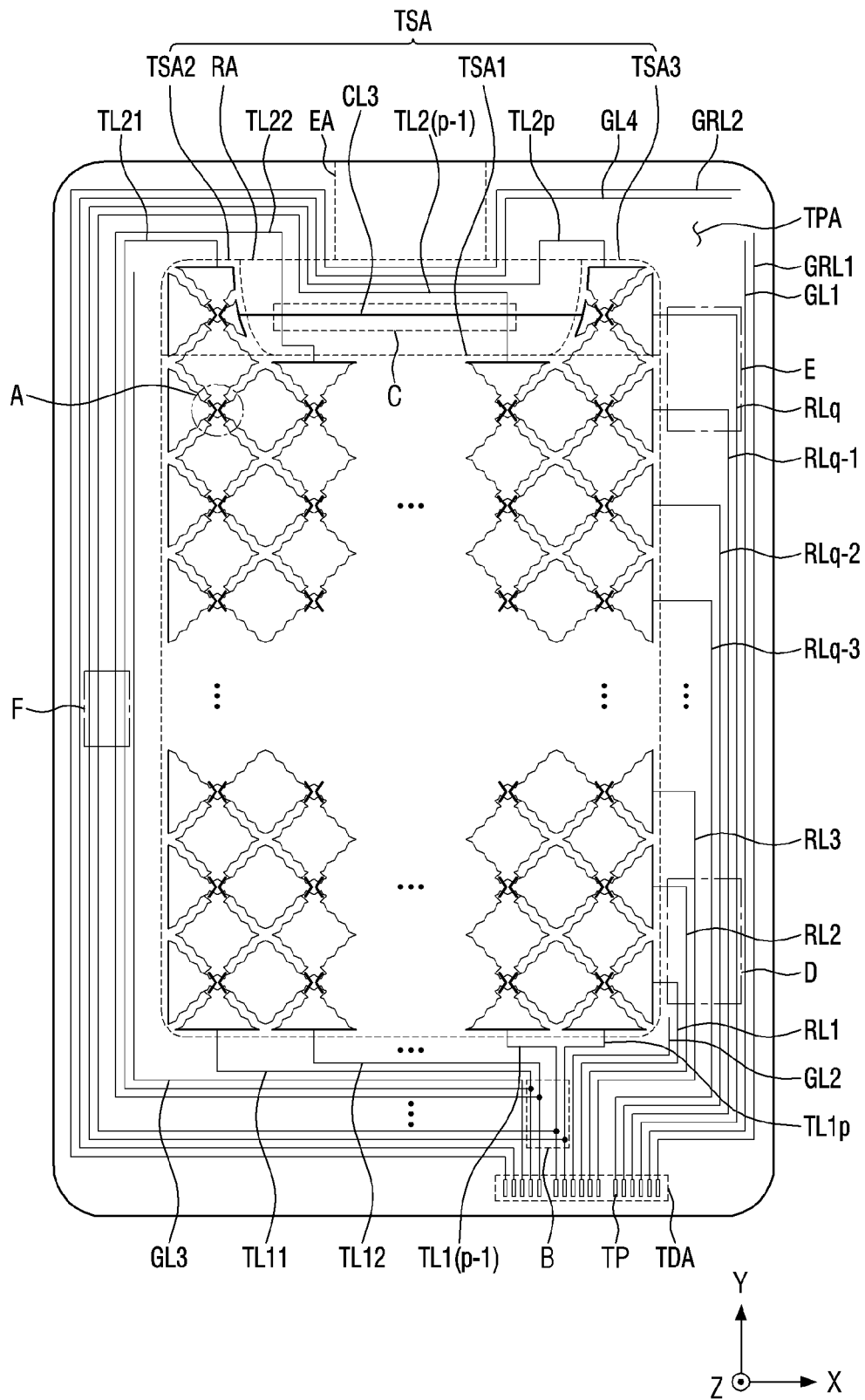
FIG. 5 is a plan view showing an example of the touch sensing unit of FIG. 3 according to some embodiments.
Figure 6:
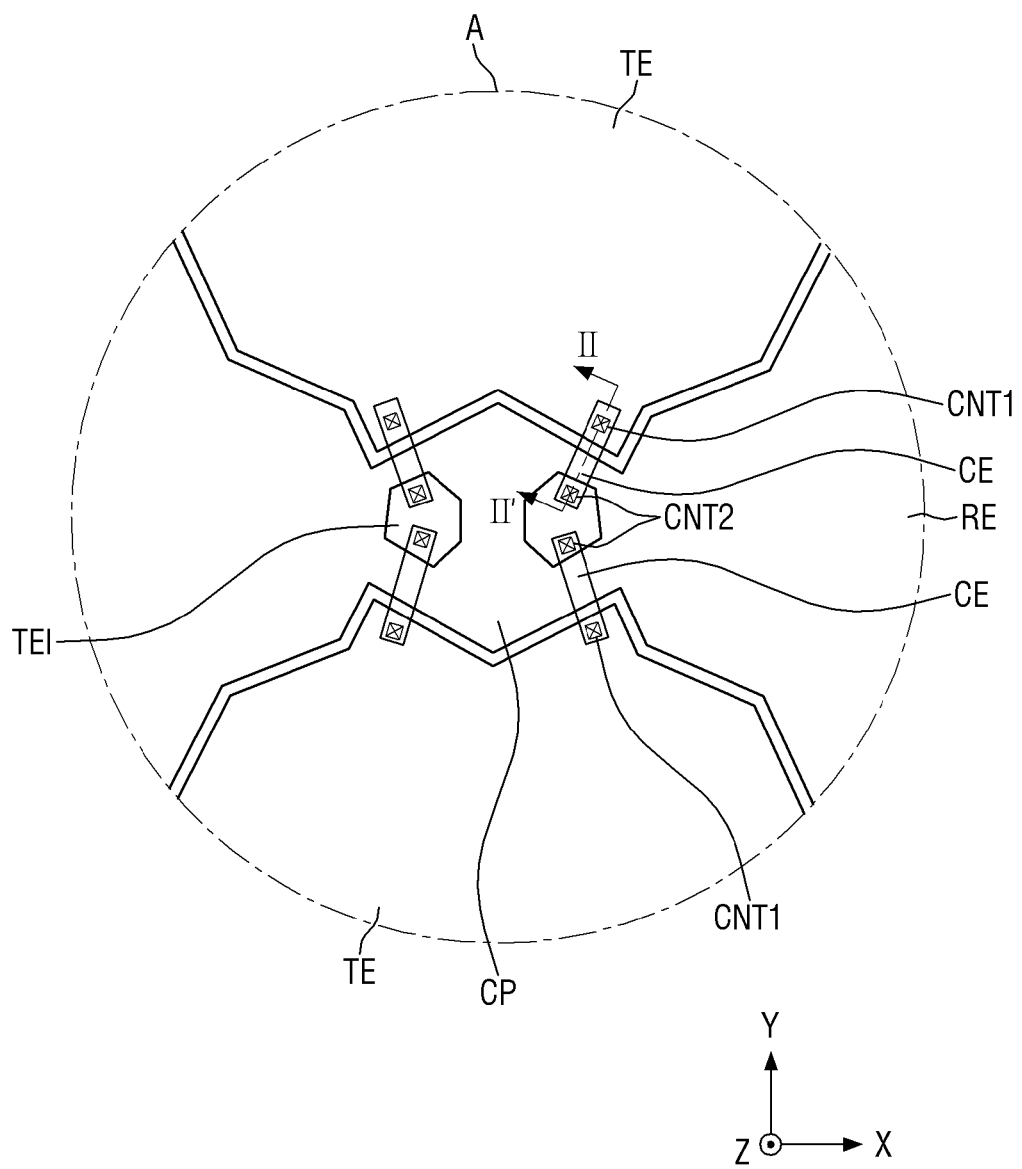
FIG. 6 is an enlarged plan view showing an example of the area A of FIG. 5 according to some embodiments.

As shown in FIGS. 5 and 6, the touch electrodes of the touch sensor layer TSL may be disposed in a touch sensor area TSA overlapping the display area DA. The touch signal lines and touch electrode pads of the touch sensor layer TSL may be disposed in a touch peripheral area TPA overlapping the non-display area NDA. The touch peripheral area TPA may be disposed around the touch sensor area TSA.

Although not shown, a polarizing film and a cover window may be additionally disposed on the touch sensor layer TSL. In this case, the polarizing film may be disposed on the touch sensor layer TSL, and the cover window may be attached onto the polarizing film by a transparent adhesive member such that the polarizing film is between the cover window and the touch sensing layer TSL.

The adhesive member SEAL may attach the first substrate SUB1 of the display unit DU to the second substrate SUB2 of the touch sensing unit TDU. The adhesive member SEAL may be a frit adhesive layer, an ultraviolet-curable resin layer, or a thermosetting resin layer, but embodiments are not limited thereto.

Although it is illustrated in FIG. 3 that an empty space is formed between the light emitting element layer EML and the second substrate SUB2, embodiments are not limited thereto. For example, a filling film may be disposed between the light emitting element layer EML and the second substrate SUB2. The filling film may be an epoxy filling film or a silicon filling film.

FIG. 4 is a plan view showing an example of the display unit of FIG. 3 according to some embodiments. For convenience of explanation, FIG. 4 shows pixels P of the display unit DU, scan lines SL, data lines DL, a power supply line PL, scan control lines SCL, a scan driving unit 110, a display driving circuit 200, display electrode pads DP, data connection lines DLL, and pad connection lines PLL.

Referring to FIG. 4, the display panel 100 may include a display area DA where pixels P are formed to display an image, and a non-display area NDA that may be a peripheral area of the display area DA. The non-display area NDA may be defined as an area from the outside of the display area DA to the edge of the display panel 100.

The scan lines SL, the data lines DL, the power supply line PL, and the pixels P may be disposed in the display area DA. The scan lines SL may be formed in parallel in a first direction (X-axis direction), and the data lines DL may be formed in parallel in a second direction (Y-axis direction) intersecting the first direction (X-axis direction). The power supply line PL may include at least one line formed in parallel with the data lines DL in the second direction (Y-axis direction) and a plurality of lines branched from the at least one line in the first direction (X-axis direction).

Each of the pixels P may be connected to at least one of the scan lines SL, at least one of the data lines DL, and the power supply line PL. Although not shown, each of the pixels P may include thin film transistors including a driving transistor and at least one switching transistor, an organic light emitting diode, and a capacitor. Each of the pixels P may receive a data voltage of (or from) a data line DL when a scan signal is applied from a scan line SL, and may supply a drive current to the organic light emitting diode in response to a data voltage applied to a gate electrode to emit light.

The scan driving unit (or circuit) 110, the display driving circuit 200, the scan control lines SCL, the data connection lines DLL, and the pad connection lines PLL may be disposed in the non-display area NDA.

The scan driving unit 110 is connected to the display driving circuit 200 through at least one scan control line SCL. Therefore, the scan driving unit 110 may receive a scan control signal of the display driving circuit 200. The scan driving unit 110 generates scan signals in response to the scan control signal and supplies the scan signals to the scan lines SL.

Although it is illustrated in FIG. 4 that the scan driving unit 110 is formed in the non-display area NDA outside one side of the display area DA, embodiments are not limited thereto. For example, the scan driving unit 110 may be formed in the non-display area NDA outside both sides of the display area DA, or any other suitable location.

The display driving circuit 200 is connected to the display electrode pads DP of a display pad area DPA through the pad connection lines PLL to receive digital video data and timing signals. The display driving circuit 200 converts the digital video data into analog positive/negative data voltages, and supplies the analog positive/negative data voltages to the data lines DL through the data connection lines DLL. Further, the display driving circuit 200 generates and supplies scan control signals for controlling the scan driving unit 110 through the scan control line SCL. Pixels P to which data voltages are to be supplied may be selected, and data voltages may be supplied to the selected pixels P. The display driving circuit 200 may be formed of an integrated circuit (IC), and may be attached onto the substrate first substrate SUB1 by a chip-on-glass (COG) method, a chip-on-plastic (COP) method, an ultrasonic bonding method, or any other suitable method.

FIG. 5 is a plan view showing an example of the touch sensing unit of FIG. 3 according to some embodiments. FIG. 6 is an enlarged plan view showing an example of the area A of FIG. 5 according to some embodiments.

Referring to FIG. 5, the touch sensing unit TDU includes a touch sensor area TSA for sensing a user's touch and a touch peripheral area TPA disposed around the touch sensor area TSA. The touch sensor area TSA may overlap the display area DA of the display unit DU, and the touch peripheral area TPA may overlap the non-display area NDA of the display unit DU.

The touch sensor area TSA may include a first touch sensor area TSA1, a second touch sensor area TSA2, and a third touch sensor area TSA3. The first touch sensor area TSA1 may have a rectangular shape in a plan view. The first touch sensor area TSA1 may occupy most of the area of the touch sensor area TSA.

The second touch sensor area TSA2 and the third touch sensor area TSA3 may protrude from one side of the first touch sensor area TSA1. The second touch sensor area TSA2 may protrude from one edge of one side of the first touch sensor area TSA1, and the third touch sensor area TSA3 may protrude from the other edge of one side of the first touch sensor area TSA1. The touch sensor area TSA may further include a recessed area RA having a shape in which the center of one side thereof is recessed. The recessed area RA may be disposed between the second touch sensor area TSA2 and the third touch sensor area TSA3.

A third connection line CL3 for connecting some of second touch signal lines TL21 to TL2p (where "p" is a positive integer greater than or equal to two) with a second touch electrode RE of the second touch sensor area TSA2 and a second touch electrode RE of the third touch sensor area TSA3 may be disposed in the recessed area RA. Thus, some of the second touch signal lines TL21 to TL2p may intersect the third connection line CL3 in the area C of the recessed area RA. Details of the area C will be described later with reference to FIG. 12.

Further, some of the second touch signal lines TL21 to TL2p are disposed in the recessed area RA, and thus, an empty area EA may be disposed outside one side of the recessed area RA in the second direction (Y-axis direction). When the display device 10 is implemented as a mobile phone, a smart phone, or a table personal computer (table PC), one or more electronic components (e.g., a camera device, a proximity sensor device, a luminance sensor device, an iris recognition sensor device, and/or the like), may be disposed to overlap the empty area EA. In this manner, a separate bezel region for accommodating the camera device, proximity sensor device, luminance sensor device, iris recognition sensor device, etc., of the mobile phone, smart phone, or table PC may be omitted. Therefore, a bezel region may be greatly reduced on one side of a mobile phone, a smart phone, a tablet PC, etc.

Further, the second substrate SUB2 may be removed from (or in) an area overlapping the empty area EA. In this case, the first substrate SUB1, thin film transistor layer TFTL and light emitting element layer EML of the display unit DU may also be removed from an area overlapping the empty area EA.

The first touch electrodes TE and the second touch electrodes RE may be disposed in the touch sensor area TSA. The first touch electrodes TE may be spaced apart from the second touch electrodes RE. The first touch electrodes TE may be arranged in a plurality of columns in the second direction (Y-axis direction), and the second touch electrodes RE may be arranged in a plurality of rows in the first direction (X-axis direction). The first touch electrodes TE arranged in the plurality of columns in the second direction (Y-axis direction) may be electrically connected to each other. Further, the second touch electrodes RE arranged in the plurality of rows in the first direction (X-axis direction) may be electrically connected to each other via connection portions CP (see FIG. 6).

The first touch electrodes TE and the second touch electrodes RE may be disposed in all the first touch sensor area TSA1, the second touch sensor area TSA2, and the third touch sensor area TSA3. The first touch electrodes TE and second touch electrodes RE arranged in the first touch sensor area TSA1 may be formed in a diamond shape or a triangle shape in a plan view. For instance, the first touch electrodes TE and second touch electrodes RE arranged at the edge of the first touch sensor area TSA1 may be formed in a triangle shape in a plan view, and the other first touch electrodes TE and second touch electrodes RE may be formed in a diamond shape in a plan view. In each of the second touch sensor area TSA2 and the third touch sensor area TSA3, at least one first touch electrode TE and at least one second touch electrode RE may have an irregular shape. Further, to prevent (or at least reduce) the occurrence of a moiré phenomenon due to the first touch electrodes TE and the second touch electrodes RE when viewing an image of the display device 10, the first touch electrodes TE and the second touch electrodes RE may have concave and convex sides in a plan view. The planar shape of the first touch electrodes TE and second touch electrodes RE disposed in the first touch sensor area TSA1 is not limited to that shown in FIG. 5.

To prevent the first touch electrodes TE and the second touch electrodes RE from being shorted to each other in their intersection regions, the first touch electrodes TE adjacent to each other in the second direction (Y-axis direction) may be electrically connected through at least one connection electrode CE. In this case, the first touch electrodes TE and the second touch electrodes RE may be arranged on one layer, and the connection electrode CE may be disposed on (or in) a different layer from the first touch electrodes TE and the second touch electrodes RE. Accordingly, the first touch electrodes TE electrically connected in the second direction (Y-axis direction) may be electrically insulated from the second touch electrodes RE electrically connected in the first direction (X-axis direction).

First touch signal lines TL11 to TL1p (where "p" is a positive integer of 2 or more), second touch signal lines TL21 to TL2p, third touch signal lines RL1 to RLq (where "q" is a positive integer of 2 or more), and touch electrode pads TP may be disposed in the touch peripheral area TPA.

One end of the first touch signal lines TL11 to TL1p may be connected to the first touch electrodes TE disposed on the first side of the touch sensor area TSA. Among four sides of the touch sensor area TSA, the first side of the touch sensor area TSA may be a side closest to the touch pad area TDA where the touch electrode pads TP are disposed. The other end of the first touch signal lines TL11 to TL1p may be connected to some of the touch electrode pads TP of the touch pad area TDA. That is, the first touch signal lines TL11 to TL1p serve to connect the first touch electrodes TE disposed on the first side of the touch sensor area TSA to some of the touch electrode pads TP of the touch pad area TDA.

For example, as shown in FIG. 5, the 1-1th touch signal line TL11 may be electrically connected to the first touch electrodes TE arranged in the first column of the touch sensor area TSA, and the 1-2th touch signal line TL12 may be electrically connected to the first touch electrodes TE arranged in the second column of the touch sensor area TSA. Further, the 1-(p-1)th touch signal line TL1(p-1) may be electrically connected to the first touch electrodes TE arranged in the p-1th column of the touch sensor area TSA, and the 1-pth touch signal line TL1p may be electrically connected to the first touch electrodes TE arranged in the pth column of the touch sensor area TSA. In this case, the first column of the touch sensor area TSA is a column disposed at the leftmost side of the touch sensor area TSA, and the pth column of the touch sensor area TSA is a column disposed at the rightmost side of the touch sensor area TSA.

One end of the second touch signal lines TL21 to TL2p may be connected to the first touch electrodes TE disposed on the second side of the touch sensor area TSA. The second side of the touch sensor area TSA, which is a side opposite to the first side of the touch sensor area TSA, may be a side where the recessed area RA is formed. The other end of the second touch signal lines TL21 to TL2p may be connected to others of the touch electrode pads TP of the touch pad area TDA. That is, the second touch signal lines TL21 to TL2p serve to connect the first touch electrodes TE disposed on the second side of the touch sensor area TSA to others of the touch electrode pads TP of the touch pad area TDA.

For example, as shown in FIG. 5, the 2-1th touch signal line TL21 may be electrically connected to the first touch electrodes TE arranged in the first column of the touch sensor area TSA, and the 2-2th touch signal line TL22 may be electrically connected to the first touch electrodes TE arranged in the second column of the touch sensor area TSA. Further, the 2-(p-1)th touch signal line TL2(p-1) may be electrically connected to the first touch electrodes TE arranged in the p-1th column of the touch sensor area TSA, and the 2-pth touch signal line TL2p may be electrically connected to the first touch electrodes TE arranged in the pth column of the touch sensor area TSA.

The second touch signal lines TL21 to TL2p may be connected to the first touch electrodes TE arranged on the second side of the touch sensor area TSA via the first outside and fourth outside of the touch sensor area TSA. The second touch signal lines TL21 to TL2p may be branched from the first touch signal lines TL11 to TL1p, and thus, some of the first touch signal lines TL11 to TL1p may intersect some of the second touch signal lines TL21 to TL2p in the area B. The area B may be disposed between the touch pad area TDA and the first side of the touch sensor area TSA. Details of the area B will be described in more detail with reference to FIGS. 8, 9, and 10.

For example, as shown in FIG. 5, the 2-1th touch signal line TL21 may be branched from the 1-1th touch signal line TL11, and the 2-2th touch signal line TL22 may be branched from the 2-1th touch signal line TL21. The 2-(p-1) th touch signal line TL2(p-1) may be branched from the 1-(p-1)th touch signal line TL1(p-1), and the 2-pth touch signal line TL2p may be branched from the 1-pth touch signal line TL1p.

One end of the third touch signal lines TL31 to TL3q may be connected to the second touch electrodes RE disposed on the third side of the touch sensor area TSA. The third side of the touch sensor area TSA may be a side opposite to the fourth side of the touch sensor area TSA. The other end of the third touch signal lines TL31 to TL3q may be connected to others of the touch electrode pads TP of the touch pad area TDA. That is, the third touch signal lines TL31 to TL3q serve to connect the second touch electrodes RE disposed on the third side of the touch sensor area TSA to others of the touch electrode pads TP of the touch pad area TDA.

For example, as shown in FIG. 5, the 3-1th touch signal line RL1 may be electrically connected to the second touch electrodes RE arranged in the first row of the touch sensor area TSA, the 3-2th touch signal line RL2 may be electrically connected to the second touch electrodes RE arranged in the second row of the touch sensor area TSA, and the 3-3th touch signal line RL3 may be electrically connected to the second touch electrodes RE arranged in the third row of the touch sensor area TSA. Further, the 3-(q-2)th touch signal line RLq-2 may be electrically connected to the second touch electrodes RE arranged in the q-2th row of the touch sensor area TSA, the 3-(q-1)th touch signal line RLq-1 may be electrically connected to the second touch electrodes RE arranged in the q-1th row of the touch sensor area TSA, and the 3-qth touch signal line RLq may be electrically connected to the second touch electrodes RE arranged in the qth row of the touch sensor area TSA.

The touch electrode pads TP may be disposed on one side of the second substrate SUB2. The touch circuit board 410 may be attached onto touch electrode pads TP using an anisotropic conductive film. Thus, the touch electrode pads TP may be electrically connected to the touch circuit board 410.

As previously mentioned, the first touch electrodes TE and the second touch electrodes RE may be driven by a mutual capacitance method or a self-capacitance method.

When the first touch electrodes TE and the second touch electrodes RE are driven by a mutual capacitance method, touch driving signals are supplied to the first touch electrodes TE through the first touch signal lines TL11 to TL1p and the second touch signal lines TL21 to TL2p, thereby charging mutual capacitances formed in the intersection regions of the first touch electrodes TE and the second touch electrodes RE. Then, charge change amounts of the mutual capacitances are measured through the second touch electrodes RE, and whether a touch input is performed is determined according to the charge change amounts of the mutual capacitances. The touch driving signal may be a signal having a plurality of touch driving pulses.

When the first touch electrodes TE and the second touch electrodes RE are driven by a self-capacitance method, touch driving signals are supplied to the first touch electrodes TE and the second touch electrodes RE through the first touch signal lines TL11 to TL1p, the second touch signal lines TL21 to TL2p, and the third touch signal lines RL1 to RLq, thereby charging self-capacitances of the first touch electrodes TE and the second touch electrodes RE. Then, charge change amounts of the self-capacitances are measured through the first touch signal lines TL11 to TL1p, the second touch signal lines TL21 to TL2p, and the third touch signal lines RL1 to RLq, and whether a touch input is performed is determined according to the charge change amounts of self-capacitances.

Hereinafter, for convenience of explanation, a description will be mainly be made with the assumption that the first touch electrodes TE and the second touch electrodes RE are driven by a mutual capacitance method in which a plurality of touch driving pulses are applied to the first touch electrodes TE and the charge change amounts of mutual capacitances are measured through the third touch signal lines RL1 to RLq connected to the second touch electrodes RE. In this case, the first touch electrodes TE may function as touch driving electrodes, the second touch electrodes RE may function as touch sensing electrodes, the first touch signal lines TL11 to TL1p and the second touch signal lines TL21 to TL2p may function as touch driving lines, and the third touch signal lines RL1 to RLq may function as touch sensing lines.

Further, a first guard line GL1, a second guard line GL2, a third guard line GL3, a first ground line GRL1, and a second ground line GRL2 may be arranged in the touch peripheral area TPA.

The first guard line GL1 may be disposed outside the 3-qth touch signal line RLq disposed at the outermost of the third touch signal lines RL1 to RLq. Further, the first ground line GRL1 may be disposed outside the first guard line GL1. That is, since the first guard line GL1 is disposed between the first ground line GRL1 and the 3-qth touch signal line RLq disposed at the outermost of the third touch signal lines RL1 to RLq, the first guard line GL1 may serve to minimize the influence of the voltage change of the first ground line GRL1 on the 3-q touch signal line RLq. One end of the first guard line GL1 and one end of the first ground line GRL1 may be connected to the rightmost touch electrode pads TP.

The second guard line GL2 may be disposed between the 1-pth touch signal line TL1p and the 3-1th touch signal line RL1 disposed at the innermost of the third touch signal lines RL1 to RLq. Thus, the second guard line GL2 may serve to minimize the mutual influence between the 3-1th touch signal line RL1 and the 1-pth touch signal line TL1p. One end of the second guard line GL2 may be connected to the touch electrode pads TP.

The third guard line GL3 may be disposed between the 1-1th touch signal line TL11 and the 2-1th touch signal line TL21 disposed at the innermost of the second touch signal lines TL21 to TL2p. Thus, the third guard line GL3 may serve to minimize the mutual influence between the 1-1th touch signal line TL11 and the 2-1th touch signal line TL21. One end of the third guard line GL3 may be connected to the touch electrode pads TP.

The fourth guard line GL4 may be disposed outside the 2-pth touch signal line TL2p disposed at the outermost of the second touch signal lines TL21 to TL2p. Further, the second ground line GRL2 may be disposed outside the fourth guard line GL4. Since the fourth guard line GL4 is disposed between the second ground line GRL2 and the 2-pth touch signal line TL2p disposed at the outermost of the second touch signal lines TL21 to TL2p, the fourth guard line GL4 may serve to minimize the influence of the voltage change of the second ground line GRL2 on the 2-p touch signal line TL2p. One end of the fourth guard line GL4 and one end of the second ground line GRL2 may be connected to the leftmost touch electrode pads TP.

The first ground line GRL1 is disposed at the outermost from the right side of the touch sensing unit 500. The second ground line GRL2 is disposed at the outermost from the lower side, left side, and upper side of the touch sensing unit 500. A ground voltage is applied to the first ground line GRL1 and the second ground line GRL2. Thus, when static electricity is applied from the outside, the static electricity may be discharged to the first ground line GRL1 and the second ground line GRL2.

Meanwhile, when the first touch electrodes TE and the second touch electrodes RE are driven by a mutual capacitance method, it is preferable that a ground voltage is applied to the first guard line GL1, the second guard line GL2, the third guard line GL3, and the fourth guard line GL4.

According to some embodiments shown in FIG. 5, the second touch signal lines TL21 to TL2p may be branched from the first touch signal lines TL11 to TL1p, and touch driving signals may be applied to the first touch electrodes TE disposed on the first side and second side of the touch sensor area TSA by using the first touch signal lines TL11 to TL1p and the second touch signal lines TL21 to TL2p. Therefore, the touch driving signals may be stably applied to the first touch electrodes TE.

Figure 7:
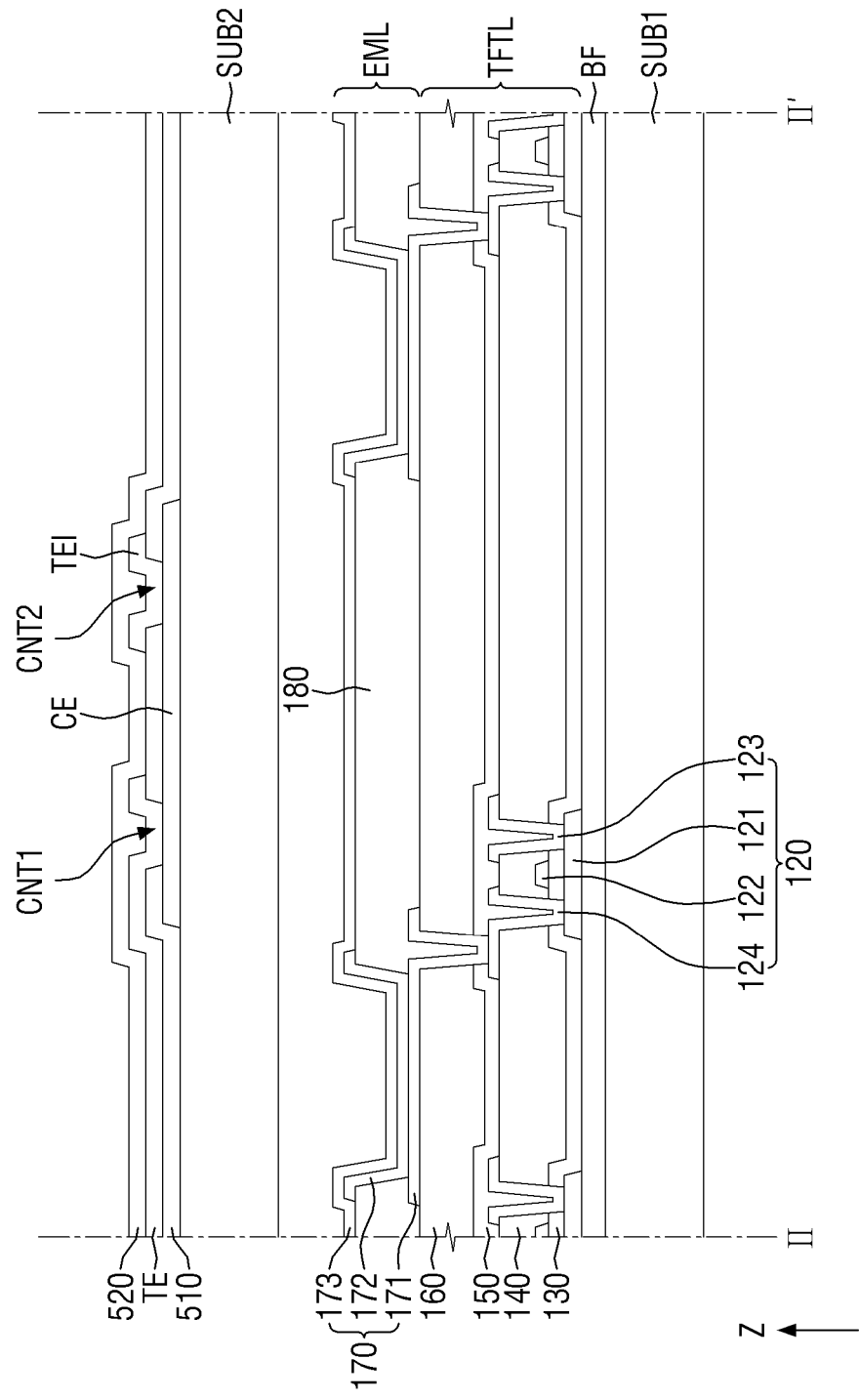
FIG. 7 is an example of a cross-sectional view taken along sectional line II-II' of FIG. 6 according to some embodiments.

FIG. 6 is an enlarged plan view showing an example of the area A of FIG. 5 according to some embodiments. FIG. 7 is an example of a cross-sectional view taken along sectional line II-II' of FIG. 6 according to some embodiments.

Referring to FIGS. 6 and 7, a thin film transistor layer TFTL is formed on the first substrate SUB1. The thin film transistor layer TFTL includes thin film transistors 120, a gate insulating film 130, an interlayer insulating film 140, a protective film 150, and a planarization film 160.

A buffer film BF may be formed on one surface of the first substrate SUB1. The buffer film BF may be formed on one surface of the first substrate SUB1 so as to protect the thin film transistors 120 and an organic light emitting layer 172 of the light emitting element layer EML from moisture penetrating through the first substrate SUB1 that is vulnerable to moisture. The buffer film BF may be formed of a plurality of alternately laminated inorganic films. For example, the buffer film BF may be formed of a multi-layer film in which one or more inorganic layers including one or more of a silicon oxide (SiOx), a silicon nitride (SiNx), and a silicon oxynitride (SiON) are alternately laminated. The buffer film BF may be omitted.

The thin film transistor 120 is formed on the buffer film BF. The thin film transistor 120 includes an active layer 121, a gate electrode 122, a source electrode 123, and a drain electrode 124. Although it is shown in FIG. 7 that the thin film transistor 120 is formed by (or in) a top gate manner in which the gate electrode 122 is located on the active layer 121, it should be noted that embodiments are not limited thereto. For instance, the thin film transistor 120 may be formed by a bottom gate manner in which the gate electrode 122 is located beneath the active layer 121, or may be formed by a double gate manner in which the gate electrode 122 is located both on and beneath the active layer 121.

The active layer 121 is formed on the buffer film BF. The active layer 121 may be formed of an organic semiconductor, such as polycrystalline silicon, monocrystalline silicon, low-temperature polycrystalline silicon, or amorphous silicon, or an oxide semiconductor. A light blocking layer (not shown) for blocking external light incident on the active layer 121 may be formed between the buffer film BF and the active layer 121.

The gate insulating film 130 may be formed on the active layer 121. The gate insulating film 130 may be formed of an inorganic layer, for example, a silicon nitride layer, a silicon oxynitride layer, a silicon oxide layer, a titanium oxide layer, or an aluminum oxide layer.

The gate electrode 122 and a gate line may be formed on the gate insulating film 130. The gate electrode 122 and the gate line may be formed of a single layer or a multi-layer including at least one of molybdenum (Mo), aluminum (Al), chromium (Cr), gold (Au), titanium (Ti), nickel (Ni), neodymium (Nd) and copper (Cu), and/or an alloy thereof.

The interlayer insulating film 140 may be formed on the gate electrode 122 and the gate line. The interlayer insulating film 140 may be formed of an inorganic layer, for example, a silicon nitride layer, a silicon oxynitride layer, a silicon oxide layer, a titanium oxide layer, or an aluminum oxide layer.

The source electrode 123 and the drain electrode 124 may be formed on the interlayer insulating film 140. Each of the source electrode 123 and the drain electrode 124 may be connected to the active layer 121 through a contact hole that penetrates the gate insulating film 130 and the interlayer insulating film 140. The source electrode 123 and the drain electrode 124 may be formed of a single layer or a multi-layer including at least one of molybdenum (Mo), aluminum (Al), chromium (Cr), gold (Au), titanium (Ti), nickel (Ni), neodymium (Nd) and copper (Cu), and/or an alloy thereof.

The protective film 150 for insulating the thin film transistor 120 may be formed on the source electrode 123 and the drain electrode 124. The protective film 150 may be formed of an inorganic layer, for example, a silicon nitride layer, a silicon oxynitride layer, a silicon oxide layer, a titanium oxide layer, or an aluminum oxide layer.

The planarization film 160 for planarizing a step due to the thin film transistor 120 may be formed on the protective film 150. The planarization film 160 may be formed of an organic film including at least one of an acryl resin, an epoxy resin, a phenolic resin, a polyamide resin, and a polyimide resin.

The light emitting element layer EML is formed on the thin film transistor layer TFTL. The light emitting element layer EML includes light emitting elements 170 and a pixel defining film 180.

The light emitting elements 170 and the pixel defining film 180 are formed on the planarization film 160. Each of the light emitting elements 170 may include a first electrode 171, an organic light emitting layer 172, and a second electrode 173.

The first electrode 171 may be formed on the planarization film 160. The first electrode 171 may be connected to the source electrode 123 of the thin film transistor 120 through a contact hole that penetrates the protective film 150 and the planarization film 160.

In a top emission structure in which light is emitted toward the second electrode 173 based on the organic light emitting layer 172, the first electrode 171 may be formed of a high-reflectance metal material, such as a laminate structure of aluminum and titanium (Ti/Al/Ti), a laminate structure of aluminum and indium tin oxide (ITO) (ITO/Al/ITO), an APC alloy, or a laminate structure of an APC alloy and ITO (ITO/APC/ITO). The APC alloy may be an alloy of at least one of silver (Ag), palladium (Pd), and copper alloy (Cu).

In a bottom emission structure in which light is emitted toward the first electrode 171 based on the organic light emitting layer 172, the first electrode 171 may be formed of a transparent conductive material (TCO), such as ITO or indium zinc oxide (IZO), which is light-transmissive, or a semi-transmissive conductive material, such as magnesium (Mg), silver (Ag), or an alloy of magnesium (Mg) and silver (Ag). In this case, when the first electrode 171 is formed of a semi-transmissive conductive material, light emission efficiency may be increased by microcavities in the first electrode 171.

The pixel defining film 180 for defining pixels P may be formed on the planarization film 160 to partition the first electrode 171. The pixel defining film 180 may be formed to cover the edge of the first electrode 171. The pixel defining film 180 may be formed of an organic layer including at least one of an acryl resin, an epoxy resin, a phenolic resin, a polyamide resin, and a polyimide resin.

Each of the pixels P refers to an area where the first electrode 171, the organic light emitting layer 172, and the second electrode 173 are sequentially laminated, and holes from the first electrode 171 and electrons from the second electrode 173 are combined with each other in the organic light emitting layer 172 to emit light.

The organic light emitting layer 172 is formed on the first electrode 171 and the pixel defining film 180. The organic light emitting layer 172 may include an organic material to emit light of a predetermined color. For example, the organic light emitting layer 172 may include a hole transporting layer, an organic material layer, and an electron transporting layer. In this case, the organic light emitting layer 172 of a red pixel may emit red light, the organic light emitting layer 172 of a green pixel may emit green light, and the organic light emitting layer 172 of a blue pixel may emit blue light. Alternatively, the organic light emitting layers 172 of pixels P may emit white light. In this case, the red pixel may further include a red color filter layer, the green pixel may further include a green color filter layer, and the blue pixel may further include a blue color filter layer.

The light emitting layer 172 may include a hole transporting layer, a light emitting layer, and an electron transporting layer. Further, the light emitting layer 172 may be formed to have a tandem structure of two stacks or more, and in this case, a charge generating layer may be formed between the stacks.

The second electrode 173 is formed on the organic light emitting layer 172. The second electrode 173 may be formed to cover the organic light emitting layer 172. The second electrode 173 may be a common layer formed commonly in the pixels P. Although not shown, a capping layer may be formed on the second electrode 173.

In a top emission structure, the second electrode 173 may be formed of a transparent conductive material (TCO), such as ITO or IZO, which is light-transmissive, or a semi-transmissive conductive material such as magnesium (Mg), silver (Ag), or an alloy of magnesium (Mg) and silver (Ag). When the second electrode 173 is formed of a semi-transmissive conductive material, light emission efficiency may be increased by microcavities in the second electrode 173.

In a bottom emission structure, the second electrode 173 may be formed of a high-reflectance metal material, such as a laminate structure of aluminum and titanium (Ti/Al/Ti), a laminate structure of aluminum and ITO (ITO/Al/ITO), an APC alloy, or a laminate structure of an APC alloy and ITO (ITO/APC/ITO). The APC alloy may be an alloy of at least one of silver (Ag), palladium (Pd), and copper alloy (Cu).

A second substrate SUB2 is disposed on the light emitting element layer EML, and a touch sensor layer TSL is formed on the second substrate SUB2. The touch sensor layer TSL includes first touch electrodes TE, second touch electrodes RE, connection electrodes CE, first touch signal lines TL11 to TL1p, second touch signal lines TL21 to TL2p, third touch signal lines RL1 to RLq, guard lines GL1, GL2, GL3, and GL4, and ground lines GRL1 and GRL2. For convenience of explanation, FIGS. 6 and 7 only illustrate the first touch electrodes TE, second touch electrodes RE, first touch island electrodes TE1 disposed between first touch electrodes TE, and connection electrodes CE.

The connection electrodes CE are formed on the second substrate SUB2. Each of the connection electrodes CE connects the first touch electrode TE and the first touch island electrode TE1. One end of each of the connection electrodes CE may be connected to the first touch electrode TE, and the other end thereof may be connected to the first touch island electrode TI.

Each of the connecting electrodes CE may be formed of an opaque metal conductive layer. For example, each of the connecting electrodes CE may be formed of a single layer or multi-layer including at least one of molybdenum (Mo), aluminum (Al), chromium (Cr), gold (Au), titanium (Ti), nickel (Ni), neodymium (Nd), and copper (Cu), and/or an alloy thereof. Thus, in order to prevent the aperture ratio of the pixel P, as shown in FIG. 7, the connection electrodes CE may not overlap the pixels P, and may overlap the pixel defining film 180.

A first insulating film 510 is formed on the connection electrodes CE. The first insulating film 510 may be formed of an inorganic layer, for example, a silicon nitride layer, a silicon oxynitride layer, a silicon oxide layer, a titanium oxide layer, or an aluminum oxide layer.

First touch electrodes TE, first touch island electrodes TEI, and second touch electrodes RE are formed on the first insulating film 510. The first touch electrode TE may be connected to the connection electrode CE through a first contact hole CNT1 that penetrates the first insulating film 510 to expose the connection electrode CE. The first touch island electrode TE1 may be connected to the connection electrode CE through a second contact hole CNT2 that penetrates the first insulating film 510 to expose the connection electrode CE. Thus, the first touch electrode TE may be connected to the first touch island electrode TE1 through the connection electrode CE. Accordingly, the first touch electrodes TE arranged in the second direction (Y-axis direction) in each of the plurality of columns may be electrically connected to each other.

The first touch electrodes TE, the first touch island electrodes TEI, and the second touch electrodes RE may be formed of a transparent metal oxide (TCO) such as ITO or IZO, which can transmit light. Thus, even when the first touch electrodes TE, the first touch island electrodes TEI, and the second touch electrodes RE overlap the pixels P, the aperture ratio of the pixel P may not deteriorate.

A second insulating film 520 is formed on the first touch electrodes TE, the first touch island electrodes TE1, and the second touch electrodes RE. The second insulating film 520 may be formed of an inorganic layer, for example, a silicon nitride layer, a silicon oxynitride layer, a silicon oxide layer, a titanium oxide layer, or an aluminum oxide layer.

Figure 8:
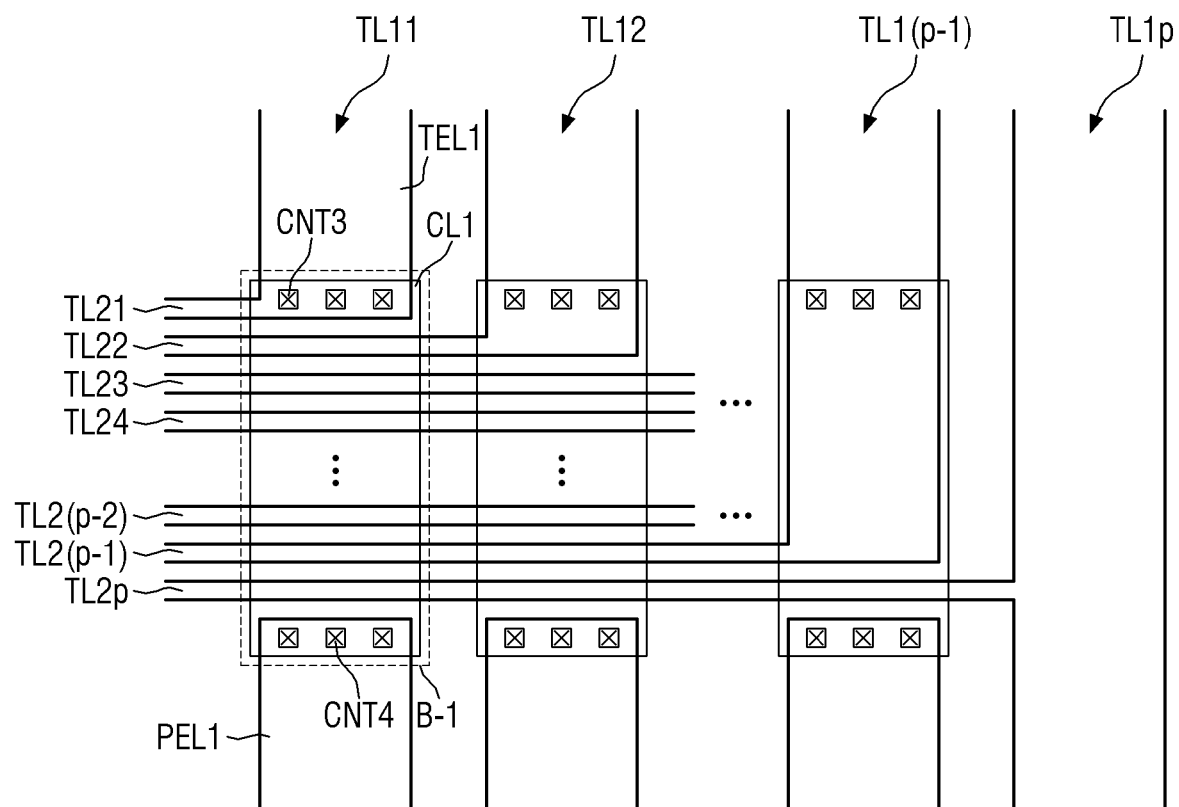
FIG. 8 is an enlarged plan view showing an example of the area B of FIG. 5 according to some embodiments.
Figure 9:
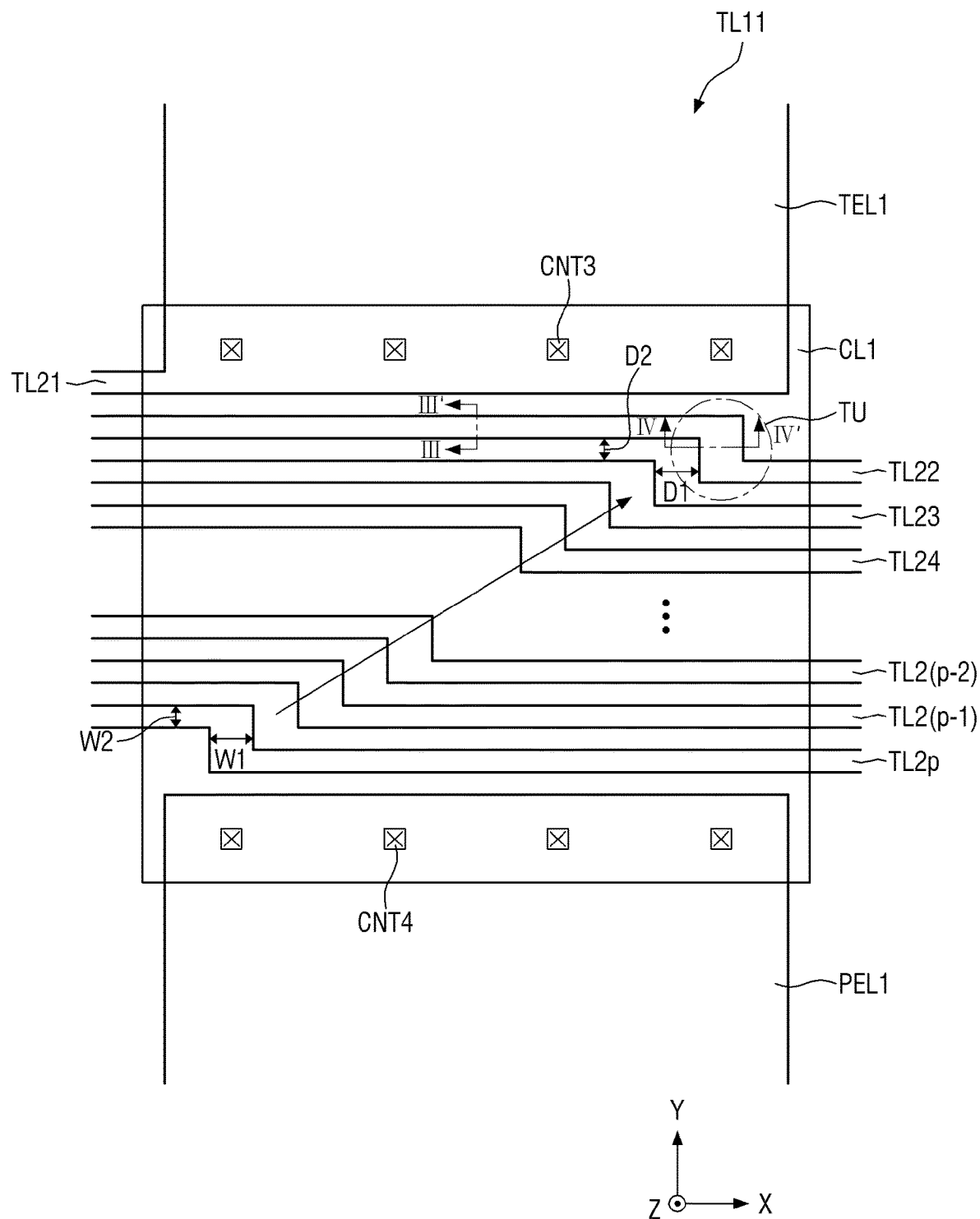
FIG. 9 is an enlarged plan view showing an example of the area B1 of FIG. 8 according to some embodiments.
Figure 10:
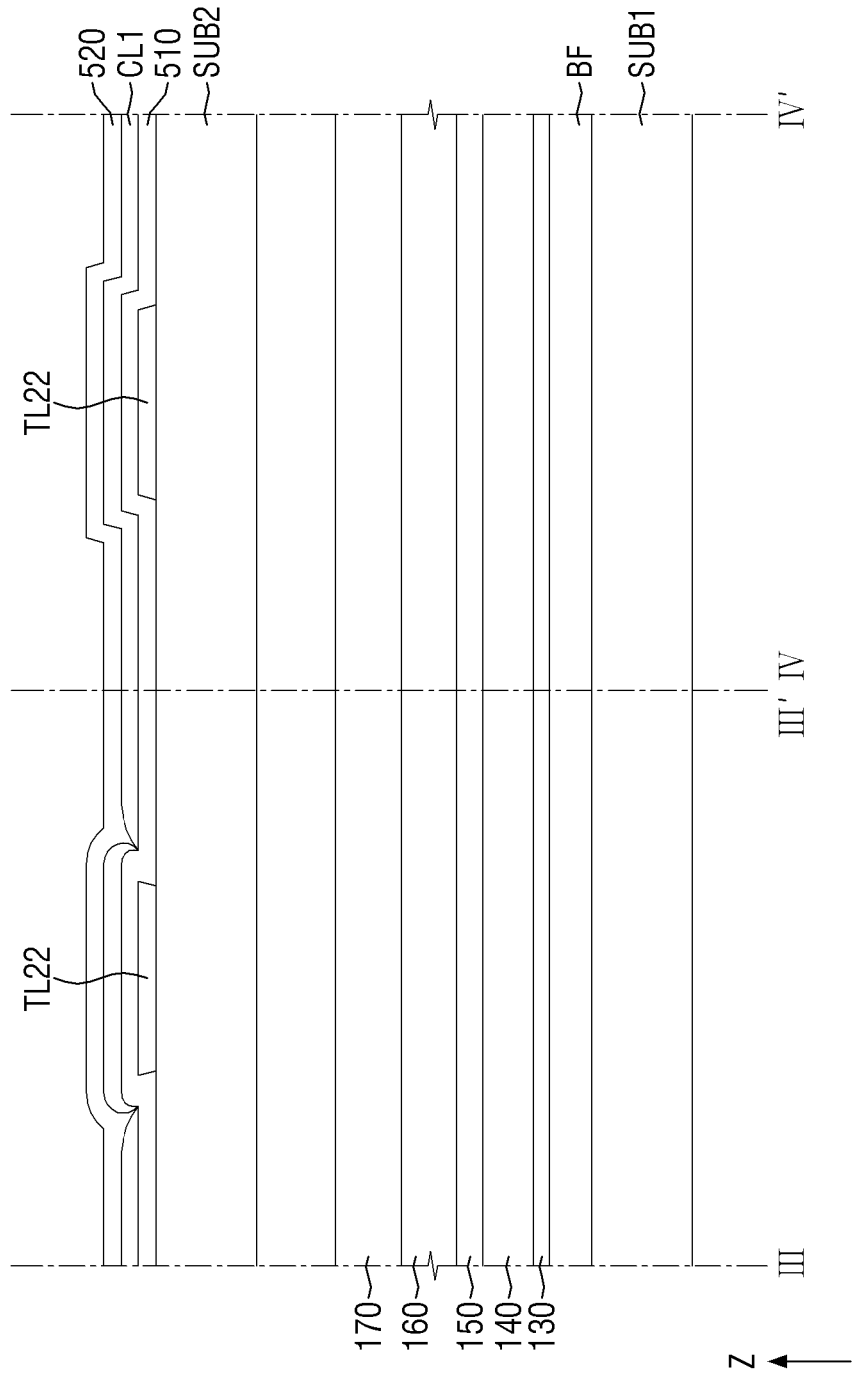
FIG. 10 is an example of a cross-sectional view taken along sectional line III-III' and IV-IV' of FIG. 9 according to some embodiments.
Figure 11:
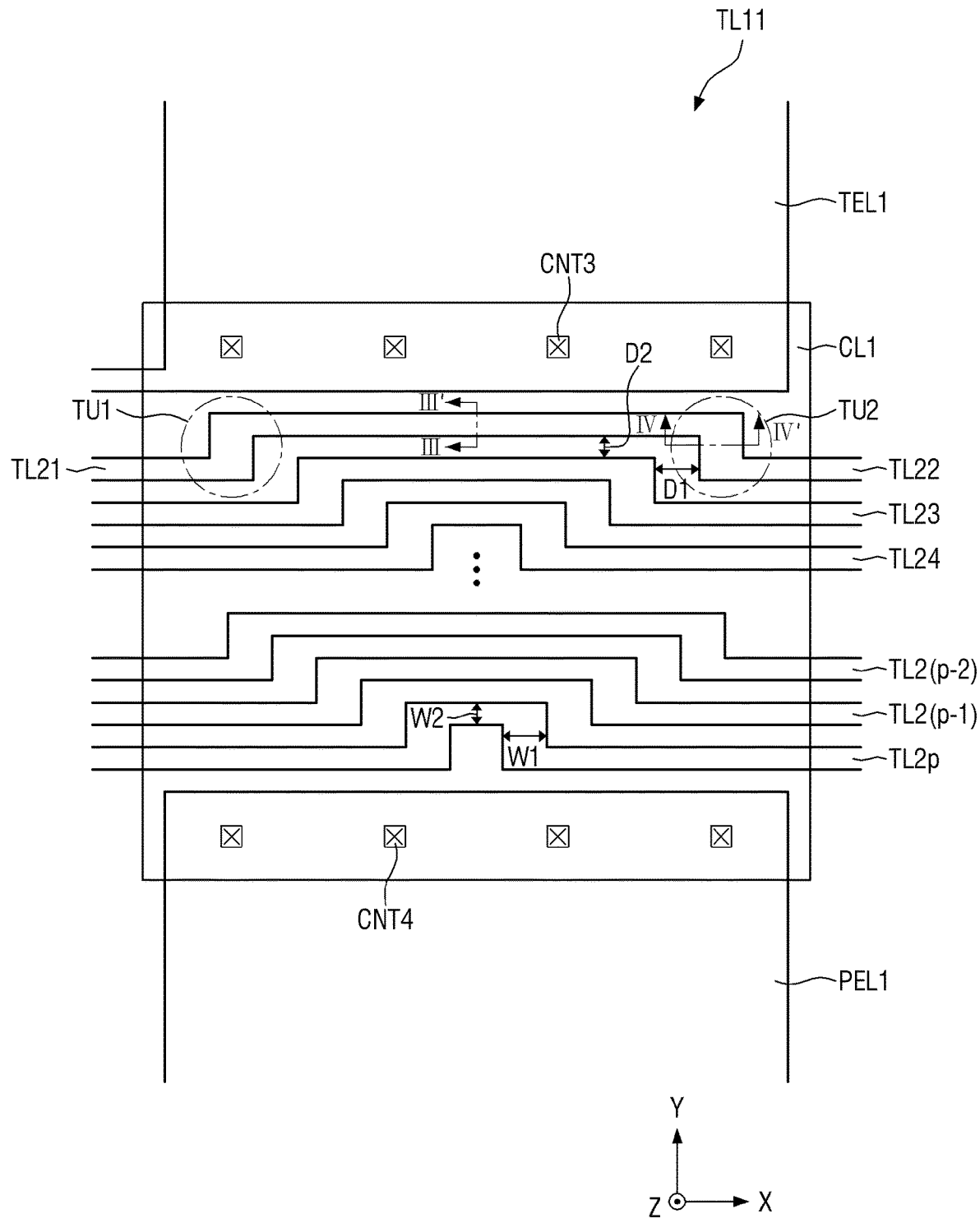
FIG. 11 is an enlarged plan view showing another example of the area B1 of FIG. 8 according to some embodiments.

FIG. 8 is an enlarged plan view showing an example of the area B of FIG. 5 according to some embodiments. FIG. 9 is an enlarged plan view showing an example of the area B-1 of FIG. 8 according to some embodiments. FIG. 10 is an example of a cross-sectional view taken along sectional line III-III' and IV-IV' of FIG. 9 according to some embodiments. FIG. 11 is an enlarged plan view showing another example of the area B-1 of FIG. 8 according to some embodiments.

Referring to FIGS. 8, 9, and 10, each of the 1-1 to 1-(p-1)th first touch signal lines TL11 to TL1(p-1) may include a first touch electrode line TEL1, a first pad electrode PEL1, and a first connection line CL1. In contrast, since the 1-pth first touch signal line TL1p does not intersect second touch signal lines TL21 to TL2p, the 1-pth first touch signal line TL1p may not include the first touch electrode line TEL1, the first pad electrode PEL1, and the first connection line CL1.

In each of the 1-1 to 1-(p-1)th first touch signal lines TL11 to TL1(p-1), the length and width of the first connection line CL1 may be substantially the same as each other. The length of the first connection line CL1 may refer to a length of the first connection line CL1 in the second direction (Y-axis direction), and the width of the first connection line CL1 may refer to a length of the first connection line CL1 in the first direction (X-axis direction).

The first touch electrode line TEL1 may be connected to the first touch electrode TE disposed on the first side of the touch sensor area TSA. The first pad electrode line PEL1 may be connected to the touch electrode pad TP of the touch pad area TDA. One end of the first connection line CL1 may be connected to the first touch electrode line TEL1, and the other end of the first connection line CL1 may be connected to the first pad electrode line PELT.

The width of the first touch electrode line TEL1 may be substantially the same as the width of the first pad electrode line PEL1, and the width of the first connection line CL1 may be greater than the width of the first touch electrode line TEL1 and the width of the first pad electrode line PELT.

The second touch signal lines TL21 to TL2p may be branched from the first touch signal lines TL11 to TL1p. For instance, the 2-1th second touch signal line TL21 may be branched from one end of the first touch electrode line TEL1 of the 1-1th first touch signal line TL11, and the 2-2th second touch signal line TL22 may be branched from one end of the first touch electrode line TEL1 of the 1-2th first touch signal line TL12. Further, the 2-(p-1)th second touch signal line TL2(p-1) may be branched from one end of the first touch electrode line TEL1 of the 1-(p-1)th first touch signal line TL1(p-1), and the 2-pth second touch signal line TL2p may be branched from the 1-pth first touch signal line TL1p.

As shown in FIG. 10, the first touch electrode line TEL1, the first pad electrode line PEL1, and the second touch signal lines TL21 to TL2p may be disposed on the second substrate SUB2. The first touch electrode line TEL1, the first pad electrode line PEL1, and the second touch signal lines TL21 to TL2p may be disposed on the same layer as the connection electrode CE. Each of the first touch electrode line TEL1, the first pad electrode line PEL1, and the second touch signal lines TL21 to TL2p may be formed of a single layer or multi-layer including at least one of molybdenum (Mo), aluminum (Al), chromium (Cr), gold (Au), titanium (Ti), nickel (Ni), neodymium (Nd), and copper (Cu), and/or an alloy thereof.

The first insulating film 510 may be disposed on the first touch electrode line TEL1, the first pad electrode line PEL1, and the second touch signal lines TL21 to TL2p, and the first connection line CL1 may be disposed on the first insulating film 510. The first connection line CL1 may be connected to the first touch electrode line TEL1 through a third contact hole CNT3 that penetrates the first insulating film 510 to expose the first touch electrode line TEL1. Further, the first connection line CL1 may be connected to the first pad electrode line PEL1 through a fourth contact hole CNT4 that penetrates the first insulating film 510 to expose the first pad electrode line PELT. Accordingly, the first touch electrode line TEL1 may be connected to the first pad electrode line PEL1 through the first connection line CL1.

The first connection line CL1 may be disposed on the same layer as the first touch electrodes TE and the second touch electrodes RE. The first connection line CL1 may be formed of a transparent metal oxide (TCO), such as ITO or IZO, that can transmit light.

Meanwhile, the 2-2 to 2-pth second touch signal lines TL22 to TL2p may overlap the first connection lines CL1 of the 1-1 to 1-(p-1)th first touch signal lines TL11 to TL1(p-1) in the intersection regions of the 1-1 to 1-(p-1)th first touch signal lines TL11 to TL1(p-1) and the 2-2 to 2-pth second touch signal lines TL22 to TL2p. As shown in FIG. 9, each of the 2-2 to 2-pth second touch signal lines TL22 to TL2p may include a bent portion TU overlapping the first connection line CL1.

The bent portions TU of the 2-2 to 2-pth second touch signal lines TL22 to TL2p may have the same shape. The bent portion TU may include a structure that is bent at least once. For example, as shown in FIG. 9, the bent portion may be bent in a "]" shape and then bent in a "[" shape. The bent portion TU may be bent twice as shown in FIG. 9, but the number of bends of the bent portion TU is not limited thereto. For example, when the bent portion TU is bent once, it may be bent in the shape of "∧" or "∨."

Alternatively, the 2-2 to 2-pth second touch signal lines TL22 to TL2p may include a plurality of bent portions overlapping the first connection line CL1, for example, a first bent portion TU1 and a second bent portion TU2 as shown in FIG. 11. Each of the first bent portion TU1 and the second bent portion TU2 may include a structure that is bent at least once.

The minimum distance between the first bent portion TU1 and the second bent portion TU2 may be changed for each of the second touch signal lines TL21 to TL2p. The first bent portion TU1 and the second bent portion TU2 may be formed symmetrically with respect to each other. For example, the first bent portion TU1 may be bent in a '|' shape and then bent in a '[' shape, whereas the second bent portion TU2 may be bent in a ']' shape and then bent in a '|' shape.

Each of the 2-2 to 2-pth second touch signal lines TL22 to TL2p has a width W1 in the first direction (X-axis direction) in the bent portion TU greater than a width W2 in the second direction (Y-axis direction) in a region other than the bent portion TU. Further, the minimum distance between the bent portions TU of the second touch signal lines TL22 to TL2p adjacent to each other is greater than the minimum distance between the second touch signal lines TL22 to TL2p adjacent to each other, e.g., the non-bent portions of the second touch signal lines TL22 to TL2p. For example, the minimum distance D1 between the bent portion TU of the 2-2th second touch signal line TL22 and the bent portion TU of the 2-3th second touch signal line TL23 is greater than the minimum distance D2 between the 2-2th second touch signal line TL22 and the 2-3th second touch signal line TL23.

As shown in FIGS. 8 and 9, the density of the 2-2 to 2-pth second touch signal lines TL22 to TL2p is high in a region where the 2-2 to 2-pth second touch signal lines TL22 to TL2p overlap the first connection line CL1. The width and distance of each of the 2-2 to 2-pth second touch signal lines TL22 to TL2p in the second direction (Y-axis direction) may be smaller than 10 μm. The second touch signal lines TL21 to TL2p may be formed by a wet etching process. In this case, when the width and distance of each of the 2-2 to 2-pth second touch signal lines TL22 to TL2p is smaller than 10 μm, the side surface of any one of the second touch signal lines TL21 to TL2p, for example, the 2-2th second touch signal line TL22 may have a taper angle of approximately 90° even when this side surface is formed in the shape of an inverse taper or a regular taper as shown in the cross-sectional view taken along sectional line III-III' as shown in FIG. 10. In this case, due to the poor film formation of the first insulating film 510 formed on the 2-2th second touch signal line TL22, the first connection line CL1 formed on the first insulating film 510 may be disconnected as shown in the cross-sectional view taken along selection line III-III' as shown in FIG. 10.

However, each of the 2-2 to 2-pth second touch signal lines TL22 to TL2p includes a bent portion TU, and is formed to have a width W1 in the first direction (X-axis direction) in the bent portion TU greater than a width W2 in the second direction (Y-axis direction) in a region other than the bent portion TU. Further, the distance between the second touch signal lines TL22 to TL2p adjacent to each other is formed to be larger in the bent portion TU than in the region other than the bent portion TU. For example, the width W1 of each of the 2-2 to 2-pth second touch signal lines TL22 to TL2p in the bent portion TU in the first direction (X-axis direction) and the minimum distance between the bent portions TU of the second touch signal lines TL22 to TL2p adjacent to each other may be 10 μm or more. Thus, in the bent portions TU of the 2-2 to 2-pth second touch signal lines TL22 to TL2p, a regular taper having a taper angle of 70° or less may be formed as shown in the cross-sectional view taken along sectional line Iv-Iv as shown in FIG. 10. Therefore, as shown in the cross-sectional view taken along sectional line Iv-Iv' as shown in FIG. 10, in the bent portions TU of the 2-2 to 2-pth second touch signal lines TL22 to TL2p, the occurrence of poor film formation of the first insulating film 510 may be prevented, and thus, the disconnection of the first connection line CL1 formed on the first insulating film 510 may be prevented. Accordingly, the first connection line CL1 may be energized in the direction of the arrow in FIG. 9.

Figure 12:
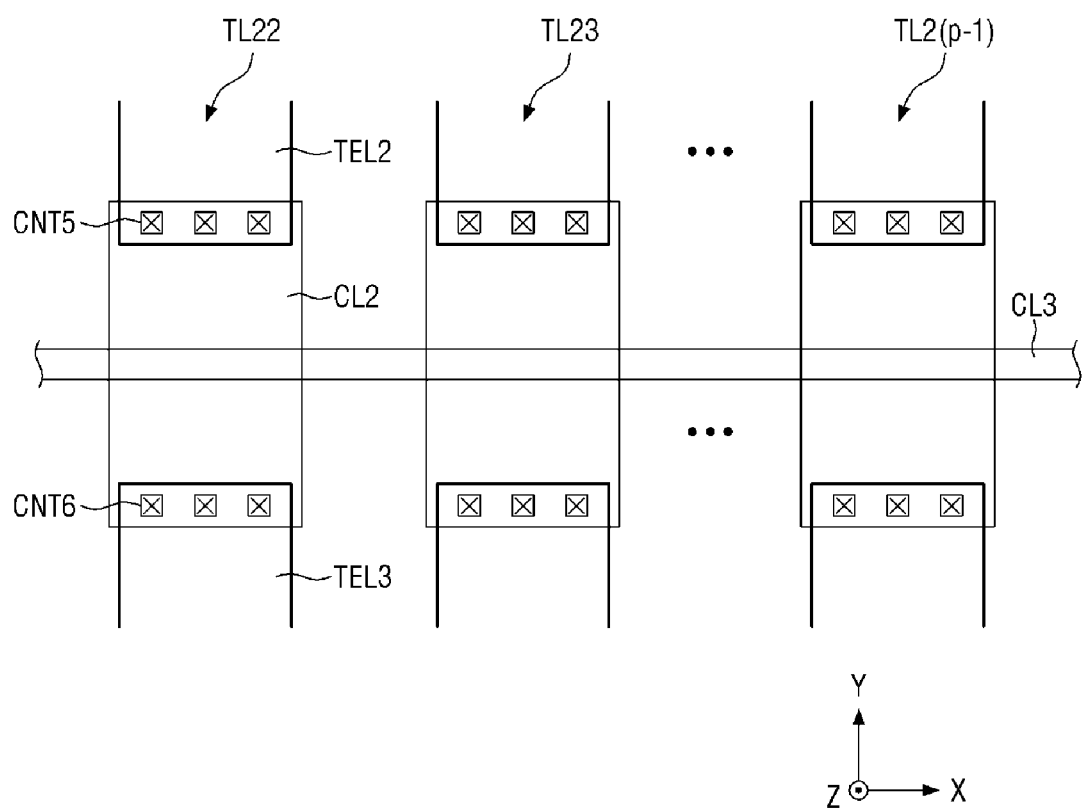
FIG. 12 is an enlarged plan view showing an example of the area C of FIG. 5 according to some embodiments.

FIG. 12 is an enlarged plan view showing an example of the area C of FIG. 5 according to some embodiments.

Referring to FIG. 12, each of the 2-2 to 2-(p-1)th second touch signal lines TL22 to TL2(p-1) may include a second touch electrode line TEL2, a third touch electrode line TEL3, and a second connection line CL2. In contrast, each of the 2-1th second touch signal line TL21 and the 2-pth second touch signal line TL2p may not include a second touch electrode line TEL2, a third touch electrode line TEL3, and a second connection line CL2 because the 2-1th second touch signal line TL21 and the 2-pth second touch signal line TL2p do not intersect the third connection line CL3.

In each of the 2-2 to 2-(p-1)th second touch signal lines TL22 to TL2(p-1), the length and width of the second connection line CL2 may be substantially the same as each other. The length of the second connection line CL2 may refer to a length of the second connection line CL2 in the second direction (Y-axis direction), and the width of the second connection line CL2 may refer to a length of the second connection line CL2 in the first direction (X-axis direction).

The second touch electrode line TEL2 may be connected to any one of the first touch signal lines TL11 to TL1p. The third touch electrode line TEL3 may be connected to the first touch electrode TE disposed on the first side of the touch sensor area TSA. One end of the second connection line CL2 may be connected to the second touch electrode line TEL2, and the other end thereof may be connected to the third touch electrode line TEL3.

The width of the second touch electrode line TEL2 may be substantially the same as the width of the third touch electrode line TEL3, and the width of the second connection line CL2 may be greater than the width of the second touch electrode line TEL2 and the width of the third touch electrode line TEL3.

The third connection line CL3 may connect the second touch electrode RE of the second touch sensor area TSA2 to the second touch electrode RE of the third touch sensor area TSA3.

The second touch electrode line TEL2, the third touch electrode line TEL3, and the third connection line CL3 may be disposed on the same layer as the connection electrode CE. Each of the second touch electrode line TEL2, the third touch electrode line TEL3, and the third connection line CL3 may be formed of an opaque metal conductive layer, for example, a single layer or multi-layer including at least one of molybdenum (Mo), aluminum (Al), chromium (Cr), gold (Au), titanium (Ti), nickel (Ni), neodymium (Nd), and copper (Cu), and/or an alloy thereof.

The first insulating film 510 may be disposed on the second touch electrode line TEL2, the third touch electrode line TEL3, and the third connection line CL3, and the second connection line CL2 may be disposed on the first insulating film 510. The second connection line CL2 may be connected to the second touch electrode line TEL2 through a fifth contact hole CNT5 that penetrates the first insulating film 510 to expose the second touch electrode line TEL2. Further, the second connection line CL2 may be connected to the third touch electrode line TEL3 through a sixth contact hole CNT6 that penetrates the first insulating film 510 and expose the third touch electrode line TEL3.

The second connection line CL2 may be disposed on the same layer as the first touch electrodes TE and the second touch electrodes RE. The second connection line CL2 may be formed of a transparent metal oxide (TCO), such as ITO or IZO, that can transmit light.

According to some embodiments, only one third connection line CL3 is formed in the intersection regions of the 2-2 to 2-(p-1)th second touch signal lines TL22 to TL2(p-1) and the third connection line CL3. Therefore, the minimum distance between the third connection line CL3 and the second touch electrode line TEL2 and the minimum distance between the third connection line CL3 and the third touch electrode line TEL3 may be maintained 10 μm or more. Accordingly, the probability of occurrence of poor film formation of the first insulating film 510 on the third connection line CL3 is low, and thus, the possibility of disconnection of the second connection line CL2 formed on the first insulating film 510 is also low. Nevertheless, to minimize the possibility of disconnection of the second connection line CL2 due to the poor film formation of the first insulating film 510, as described with reference to FIGS. 9 and 11, the third connection line CL3 may include at least one bent portion TU overlapping the second connection line CL2.

Figure 13:
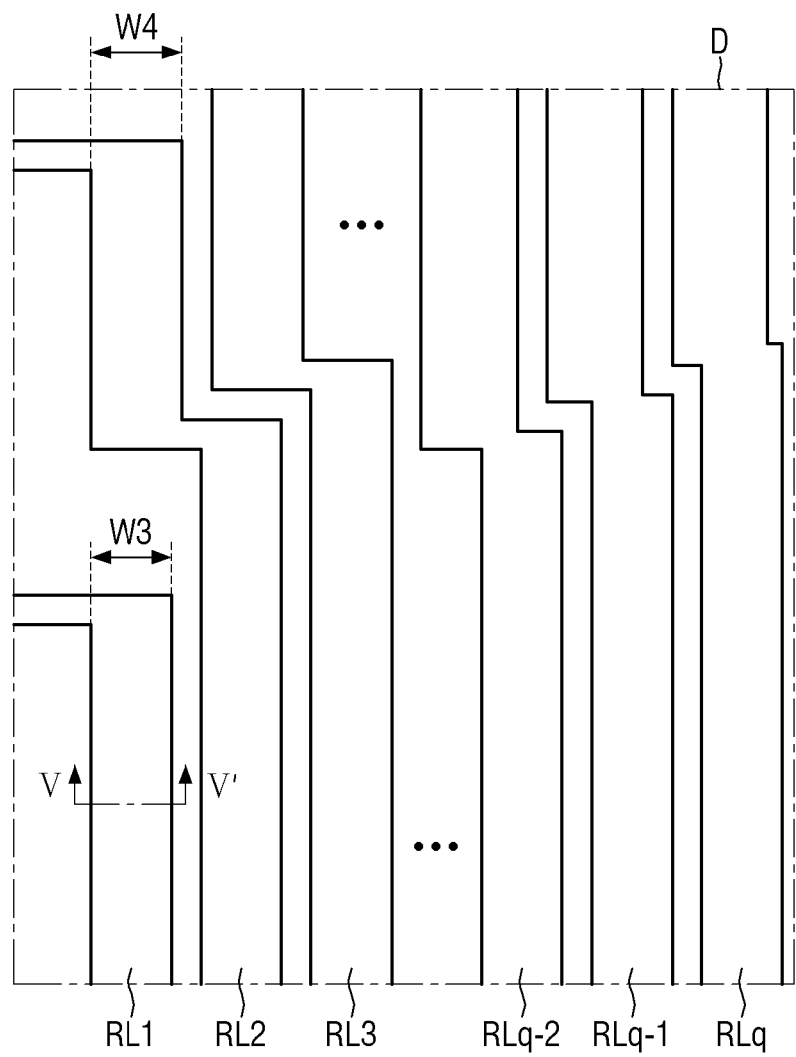
FIG. 13 is an enlarged plan view showing an example of the area D of FIG. 5 according to some embodiments.
Figure 14:
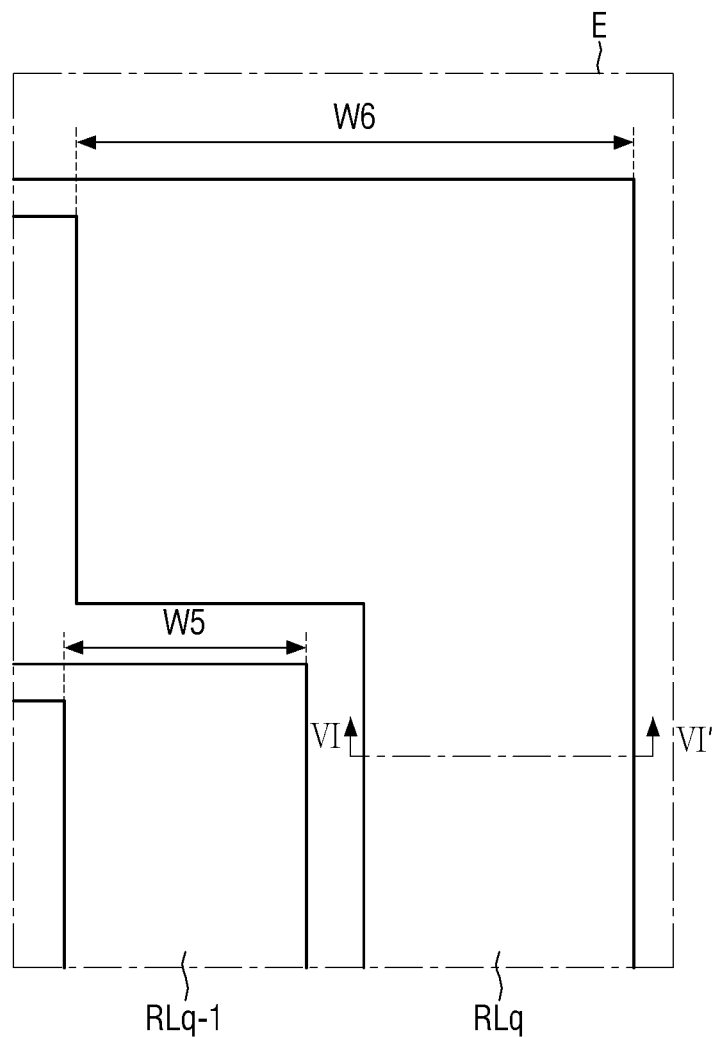
FIG. 14 is an enlarged plan view showing an example of the area E of FIG. 5 according to some embodiments.
Figure 15:
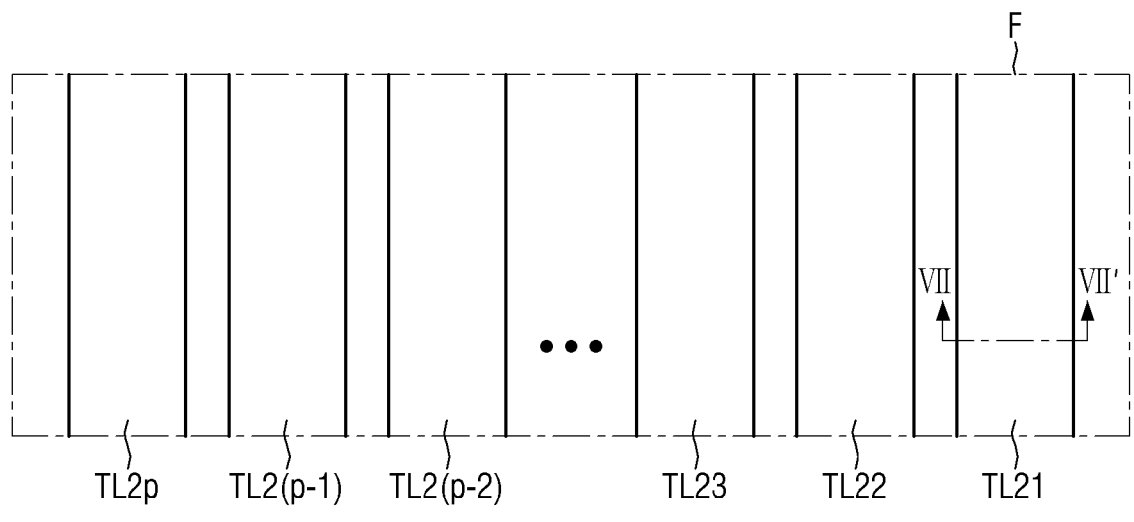
FIG. 15 is an enlarged plan view showing an example of the area F of FIG. 5 according to some embodiments.
Figure 16:
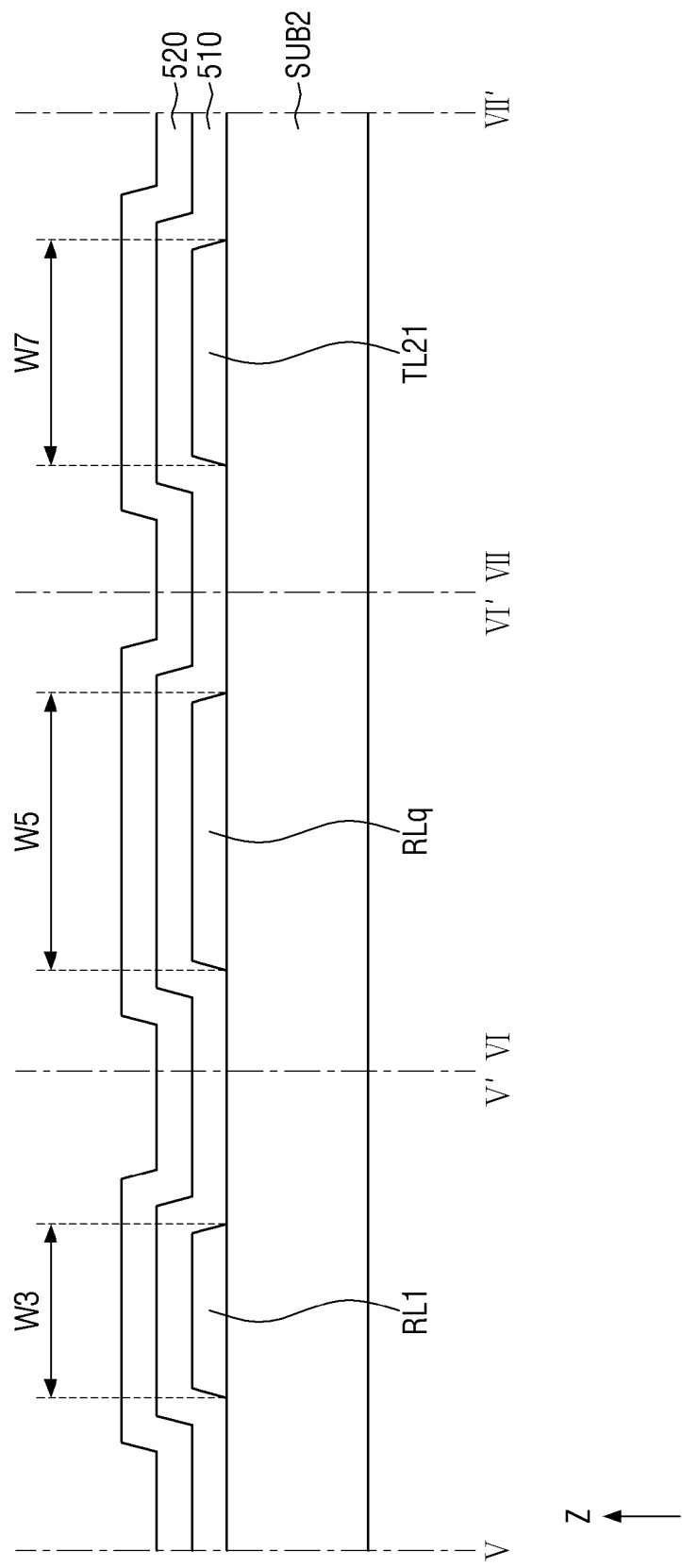
FIG. 16 is an example of a cross-sectional view taken along sectional line V-V' of FIG. 13, sectional line VI-VI' of FIG. 14, and sectional line VII-VII' of FIG. 15 according to some embodiments.

FIG. 13 is an enlarged plan view showing an example of the area D of FIG. 5 according to some embodiments. FIG. 14 is an enlarged plan view showing an example of the area E of FIG. 5 according to some embodiments. FIG. 15 is an enlarged plan view showing an example of the area F of FIG. 5 according to some embodiments. FIG. 16 is an example of a cross-sectional view taken along sectional line V-V' of FIG. 13, sectional line VI-VI' of FIG. 14, and sectional line VII-VII' of FIG. 15 according to some embodiments.

FIGS. 13 and 14 show an example where third touch signal lines RL1 to RLq are disposed on the right outside of the touch sensor area TSA. FIG. 13 shows 3-1 to 3-qth third touch signal lines RL1 to RLq, and FIG. 14 shows 3-(q-1) and 3-qth third touch signal lines RLq-1 and RLq. FIG. 15 shows an example where second touch signal lines TL21 to TL2p are disposed on the left outside of the touch sensor area TSA. The area D is disposed closer to the touch pad area TDA than the area E.

Referring to FIGS. 13 and 14, the 3-1th third touch signal line RL1 is electrically connected to the second touch electrodes RE disposed in the first row. The 3-2th third touch signal line RL2 is electrically connected to the second touch electrodes RE disposed in the second row. The 3-(q-1)th third touch signal line RLq-1 is electrically connected to the second touch electrodes RE disposed in the q-1th row. The 3-qth third touch signal line RLq is electrically connected to the second touch electrodes RE disposed in the q-th row. Accordingly, the length of wiring increases from the 3-1th third touch signal line RL1 to the 3-qth third touch signal line RLq, and thus, the wiring resistances of the third touch signal lines RL1 to RLq may be different from each other. To minimize a difference between the wiring resistances of the third touch signal lines RL1 to RLq, the wiring widths of the third touch signal lines RL1 to RLq may be designed to be extended as the number of the third touch signal lines RL1 to RLq decreases.

For example, as shown in FIG. 13, each of the 3-1 to 3-qth third touch signal lines RL1 to RLq has a third width W3. Since the 3-1th third touch signal line RL1 is electrically connected to the second touch electrodes RE disposed in the first row, the 3-1th third touch signal line RL1 is not disposed in the second row. Further, each of the 3-2 to 3-qth third touch signal lines RL2 to RLq may have a fourth width W4 that is greater than the third width W3.

According to some embodiments, the third width W3 corresponding to the width of each of the 3-1 to 3-qth third touch signal lines RL1 to RLq may be narrower than the second width W2 of each of the 2-2 to 2-pth second touch signal lines TL22 to TL2p in a region other than the bent portion TU. Further, the minimum distance D3 between the adjacent third touch signal lines RL1 to RLq disposed in the first row may be smaller than the minimum distance D2 between the adjacent second touch signal lines TL22 to TL2p in the first row. That is, the third touch signal lines RL1 to RLq disposed in the first row may be arranged at higher density than the 2-2 to 2-pth second touch signal lines TL22 to TL2p overlapping the first connection line CL1.

Further, as shown in FIG. 14, each of the 3-(q-1)th third touch signal line RLq-1 and the 3-qth third touch signal line RLq disposed in the q-1th row have a fifth width W5. Since the 3-(q-1)th third touch signal line RLq-1 is electrically connected to the second touch electrodes RE disposed in the q-1th row, the 3-(q-1)th third touch signal line RLq-1 is not disposed in the q-1th row. Accordingly, each of the 3-qth third touch signal lines RLq disposed in the qth row may have a sixth width W6. The sixth width W6 may be greater than the first to fifth widths W1 to W5.

Referring to FIGS. 15 and 16, the widths W7 of the second touch signal lines TL21 to TL2p disposed on the left outside of the touch sensor area TSA may be substantially the same as each other. The seventh width W7 may be greater than the first width W1 and the third width W3, and may be smaller than the sixth width W6.

The third touch signal lines RL1 to RLq disposed on the right outside of the touch sensor area TSA and the second touch signal lines TL21 to TL2p disposed on the left outside of the touch sensor area TSA may be disposed on the same layer as the connection electrode CE as shown in FIG. 16. Each of the third touch signal lines RL1 to RLq disposed on the right outside of the touch sensor area TSA and the second touch signal lines TL21 to TL2p disposed on the left outside of the touch sensor area TSA may be formed of an opaque metal conductive layer, for example, a single layer or multi-layer including at least one of molybdenum (Mo), aluminum (Al), chromium (Cr), gold (Au), titanium (Ti), nickel (Ni), neodymium (Nd), and copper (Cu), and/or an alloy thereof.

Figure 17:
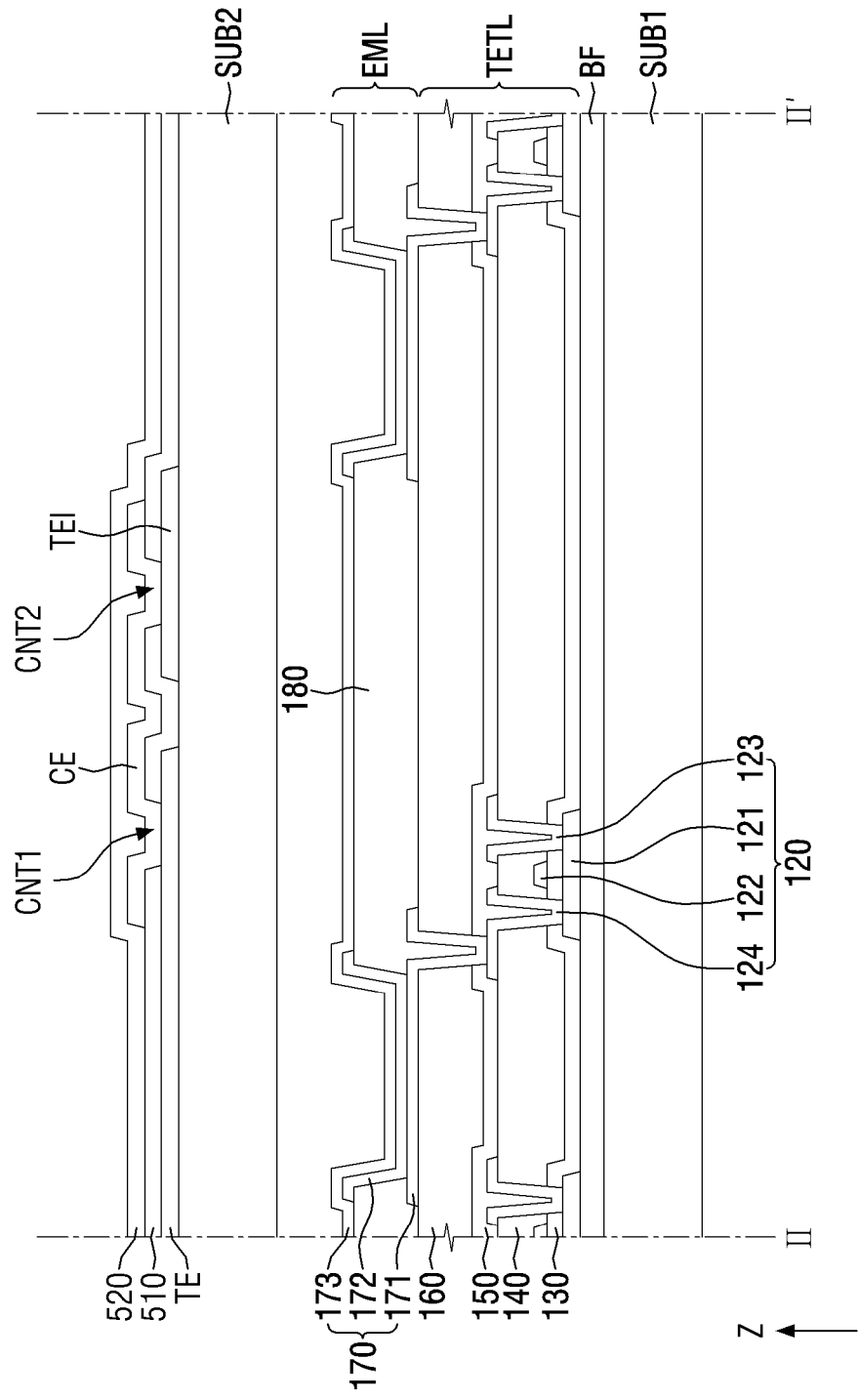
FIG. 17 is another example of a cross-sectional view taken along sectional line II-II' of FIG. 6 according to some embodiments.
Figure 18:
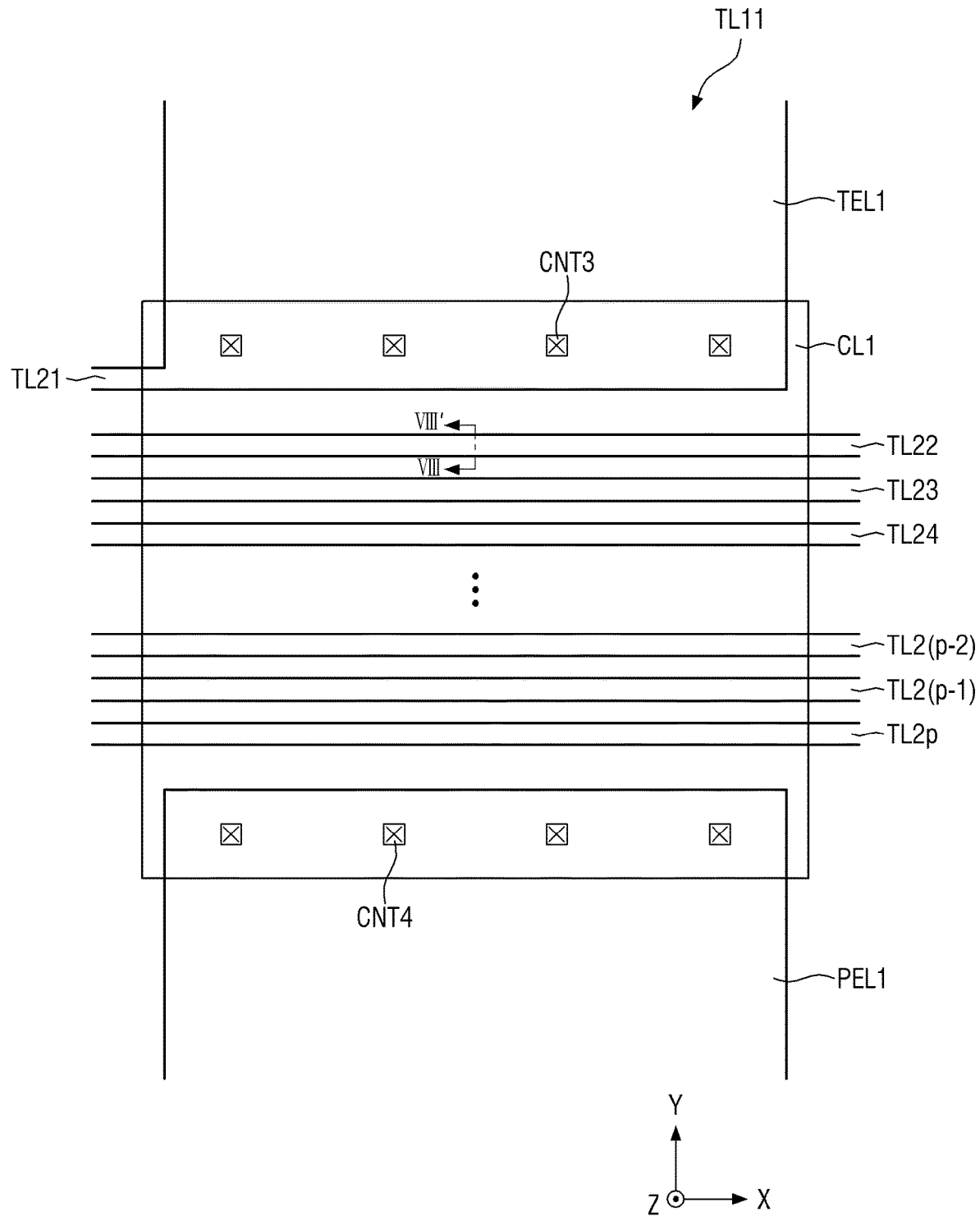
FIG. 18 is an enlarged plan view showing another example of the area B1 of FIG. 8 according to some embodiments.
Figure 19:
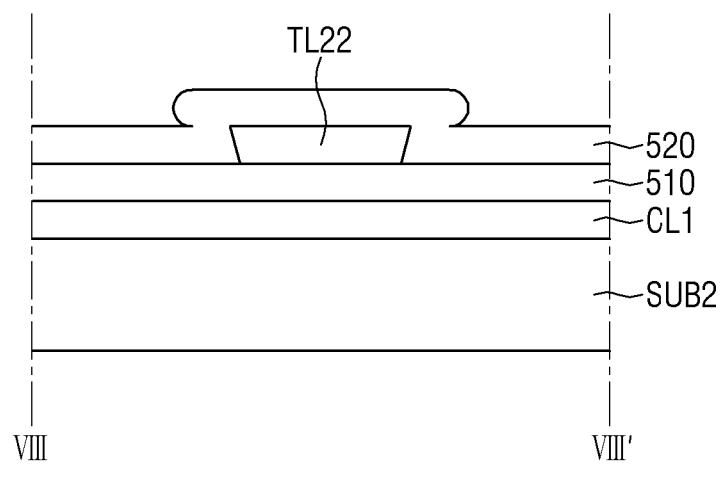
FIG. 19 is an example of a cross-sectional view taken along sectional line VIII-VIII' of FIG. 18 according to some embodiments.

FIG. 17 is another example of a cross-sectional view taken along sectional line II-IF of FIG. 6 according to some embodiments. FIG. 18 is an enlarged plan view showing another example of the area B-1 of FIG. 8 according to some embodiments. FIG. 19 is an example of a cross-sectional view taken along sectional line VIII-VIII' of FIG. 18 according to some embodiments.

The embodiments described in association with FIGS. 17, 18, and 19 are different from the embodiments described in association with FIGS. 7, 9, and 10 in that the first touch electrodes TE, the first touch island electrodes TEI, the second touch electrodes RE, and the first connection line CL1 are arranged on the second substrate SUB2, and the connection electrodes CE, the first touch electrode line TEL1, the first pad electrode line PEL1, and the second touch signal lines TL21 to TL2p are arranged on the first touch electrodes TE, the first touch island electrodes TEI, the second touch electrodes RE, and the first connection line CL1. Therefore, in FIGS. 17, 18, and 19, a description overlapping that of the embodiments described in association with FIGS. 7, 9, and 10 will be omitted.

Referring to FIGS. 17, 18, and 19, first touch electrodes TE, first touch island electrodes TEI, second touch electrodes RE, and a first connection line CL1 are formed on the second substrate SUB2. The first touch electrodes TE, the first touch island electrodes TEI, the second touch electrodes RE, and the first connection line CL1 may be formed of a transparent metal oxide (TCO), such as ITO or IZO, which can transmit light. Thus, even when the first touch electrodes TE, the first touch island electrodes TEI, and the second touch electrodes RE overlap the pixels P, the aperture ratio of the pixels P may not deteriorate.

A first insulating film 510 is formed on the first touch electrodes TE, the first touch island electrodes TEI, the second touch electrodes RE, and the first connection line CL1.

Connection electrodes CE, first touch electrode line TEL1, a first touch electrode line TEL1, a first pad electrode line PEL1, and second touch signal lines TL21 to TL2p are disposed on the first insulating film 510. Each of the connection electrodes CE, first touch electrode line TEL1, a first touch electrode line TEL1, a first pad electrode line PEL1, and second touch signal lines TL21 to TL2p may be formed of an opaque metal conductive layer, for example, a single layer or multi-layer including at least one of molybdenum (Mo), aluminum (Al), chromium (Cr), gold (Au), titanium (Ti), nickel (Ni), neodymium (Nd), and copper (Cu), and/or an alloy thereof. Thus, to prevent the aperture ratio of the pixels P from decreasing, as shown in FIG. 17, the connection electrodes CE may not overlap the pixels P, and may overlap the pixel defining film 180.

The connection electrode CE may be connected to the first touch electrode TE through a first contact hole CNT1 that penetrates the first insulating film 510 to expose the first touch electrode TE. The connection electrode CE may be connected to the first touch island electrode TE1 through a second contact hole CNT2 that penetrates the first insulating film 510 to expose the first touch island electrode TE1 Thus, the first touch electrode TE may be connected to the first touch island electrode TEI through the connection electrode CE. Accordingly, the first touch electrodes TE arranged in the second direction (Y-axis direction) in each of the plurality of columns may be electrically connected to each other.

The first touch electrode line TEL1 may be connected to the first connection line CL1 through a third contact hole CNT3 that penetrates the first insulating film 510 to expose the first connection line CL1. Further, the first pad electrode line PEL1 may be connected to the first connection line CL1 through a fourth contact hole CNT4 that penetrates the first insulating film 510 to expose the first connection line CL1. As such, the first touch electrode line TEL1 may be connected to the first pad electrode line PEL1 through the first connection line CL1.

The second touch signal lines TL21 to TL2p are disposed on the first connection line CL1 in a region where the first connection line CL1 overlaps the second touch signal lines TL22 to TL2p. When the width and distance of each of the second touch signal lines TL22 to TL2p is smaller than 10 μm, the side surface of any one of the second touch signal lines TL21 to TL2p, for example, the 2-2th second touch signal line TL22 may be formed in an inverse taper. In this case, the poor film formation of the first insulating film 510 formed on the 2-2th second touch signal line TL22 may occur. However, as shown in FIG. 19, since the first connection line CL1 is disposed under the 2-2th second touch signal line TL22, the tapered shape of the side surface of the 2-2th second touch signal line TL22 is not related to the poor film formation of the second insulating film 520. Therefore, the first touch electrode line TEL1 may be stably connected to the first pad electrode line PEL1 through the first connection line CL1.

A second insulating film 520 is formed on the connection electrodes CE, the first touch electrode line TEL1, the first pad electrode line PEL1, and the second touch signal lines TL21 to TL2p.

According to some embodiments, similarly to the area C, the second connection line CL2 of each of the 2-2 to 2-(p-1)th second touch signal lines TL22 to TL2(p-1) may be disposed under the second touch electrode line TEL2, the third touch electrode line TEL3, and the third connection line CL3. Since this configuration is similar to those having been described with reference to FIGS. 17, 18, and 19, a detailed description thereof will be omitted.

Figure 20:
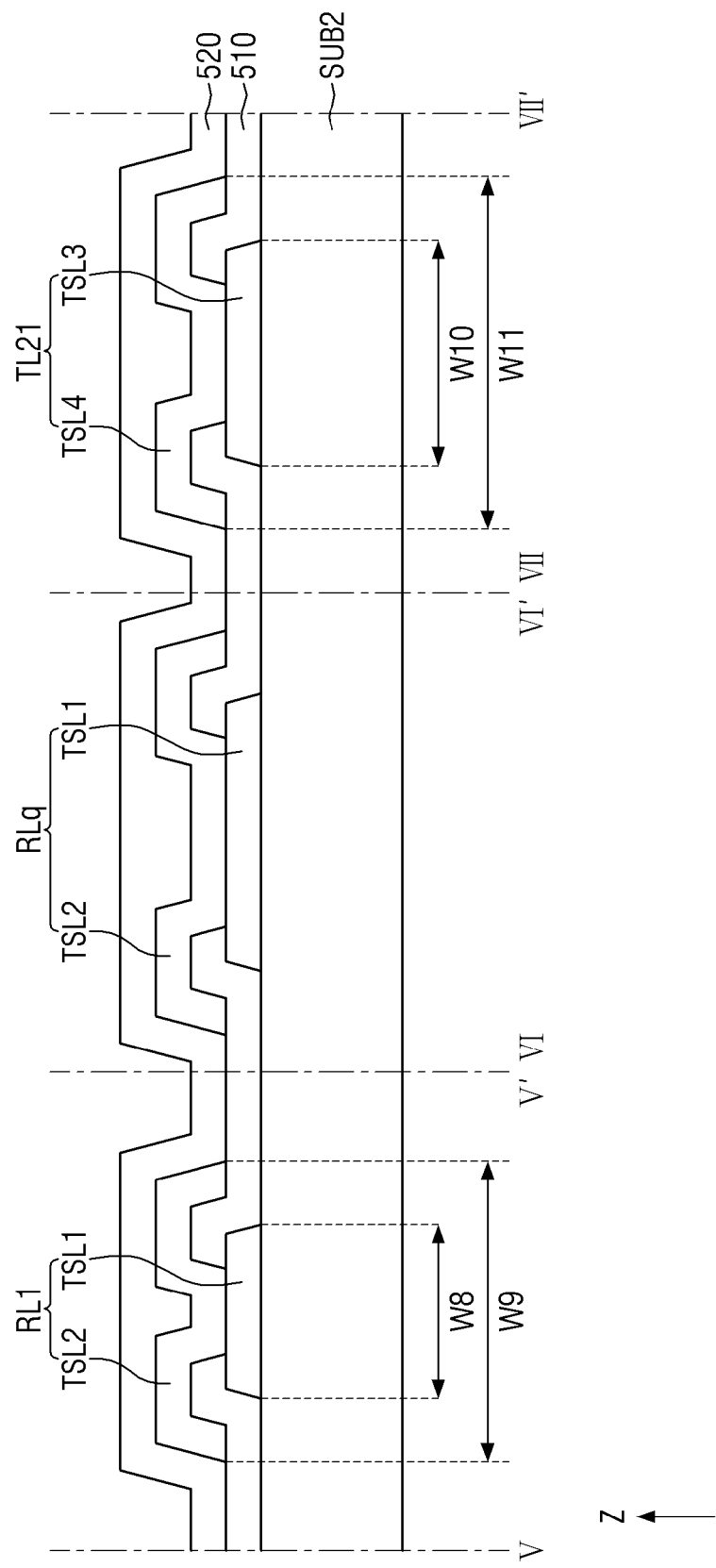
FIG. 20 is another example of a cross-sectional view taken along sectional line V-V' of FIG. 13, sectional line VI-VI' of FIG. 14, and sectional line VII-VII' of FIG. 15 according to some embodiments.

FIG. 20 is another example of a cross-sectional view taken along sectional line V-V' of FIG. 13, sectional line VI-VI' of FIG. 14, and sectional line VII-VII' of FIG. 15 according to some embodiments.

The embodiments described in association with FIG. 20 are different from the embodiments described in association with FIG. 16 in that each of the third touch signal lines RL to RLq disposed on the right outside of the touch sensor area TSA and the second touch signal lines TL21 to TL2p disposed on the left outside the touch sensor area TSA is formed of a plurality of layers. Therefore, in association with FIG. 20, a description overlapping that of the embodiments described in association with FIG. 16 will be omitted.

Referring to FIG. 20, each of the third touch signal lines RL1 to RLq may include a first touch signal layer TSL1 and a second touch signal layer TSL2. Each of the second touch signal lines TL21 to TL2p may include a third touch signal layer TSL3 and a fourth touch signal layer TSL4.

The first touch signal layer TSL1 and the third touch signal layer TSL3 may disposed on the second substrate SUB2, and a first insulating film 510 may be disposed on the first touch signal layer TSL1 and the third touch signal layer TSL3. In this case, the first touch signal layer TSL1 and the third touch signal layer TSL3 may be disposed on the same layer as the first touch electrodes TE, the first touch island electrode TEI, the second touch electrodes RE, and the first connection line CL1, which are shown in FIGS. 17, 18, and 19. The first touch signal layer TSL1 and the third touch signal layer TSL3 may be formed of a transparent metal oxide (TCO), such as ITO or IZO, that can transmit light.

The second touch signal layer TSL2 and the fourth touch signal layer TSL4 may be disposed on the first insulating film 510, and the second insulating film 520 may be disposed on the second touch signal layer TSL2 and the fourth touch signal layer TSL4. In this case, the second touch signal layer TSL2 and the fourth touch signal layer TSL4 may be disposed on the same layer as the connection electrodes CE, the first touch electrode line TEL1, the first pad electrode line PELT, and the second touch signal lines TL21 to TL2p, which are shown in FIGS. 17, 18, and 19. Each of the second touch signal layer TSL2 and the fourth touch signal layer TSL4 may be formed of an opaque metal conductive layer, for example, a single layer or multi-layer including at least one of molybdenum (Mo), aluminum (Al), chromium (Cr), gold (Au), titanium (Ti), nickel (Ni), neodymium (Nd), and copper (Cu), and/or an alloy thereof.

According to some embodiments, when the width W8 of the first touch signal layer TSL1 is larger than the width W9 of the second touch signal layer TSL2, a short circuit may occur between the third touch signal lines RL1 to RLq adjacent to each other. However, when the first touch signal layer TSL1 is formed of a transparent metal oxide, it is difficult to inspect the occurrence of a short circuit. Therefore, the width W8 of the first touch signal layer TSL1 may be made smaller than the width W9 of the second touch signal layer TSL2. For a similar reason, the width W10 of the third touch signal layer TSL3 may be made smaller than the width W11 of the fourth touch signal layer TSL4.

As shown in FIGS. 13 and 14, for uniform resistance design, the third touch signal lines RL1 to RLq may be designed by extending the wiring widths (e.g., in the X-axis direction) of the third touch signal lines RL1 to RLq as the number of the third touch signal lines RL1 to RLq decreases. In this case, both the wiring width of the first touch signal layer TSL1 and the wiring width of the second touch signal layer TSL2 of each of the third touch signal lines RL1 to RLq can be extended. Alternatively, only the wiring width of the second touch signal layer TSL2 of each of the third touch signal lines RL1 to RLq may be extended. In this case, the first touch signal layer TSL1 of each of the third touch signal lines RL1 to RLq may have the same width regardless of the extension of the wiring width.

As shown in FIG. 20, the second touch signal layer TSL2 may be connected to the first touch signal layer TSL1 through a contact hole penetrating the first insulating film 510. The fourth touch signal layer TSL4 may be connected to the third touch signal layer TSL3 through a contact hole penetrating the first insulating film 510. When the touch sensing unit 500 is cut by a scribing process in a touch mother board (or substrate), the first insulating film 510 and the second insulating film 520 may be opened by fragments of the second substrate SUB2 of the touch sensing unit 500. Thus, some of the third touch signal lines RL1 to RLq, first guard line GL1 and first ground line GRL1 disposed on the right outside of the touch sensor area TSA, and some of the second touch signal lines TL21 to TL2p, fourth guard line GL4 and second ground line GRL2 disposed on the left outside of the touch sensor area TSA may be exposed without being covered by the first insulating film 510 and the second insulating film 520. In this case, since the exposed lines may be oxidized, some of the second touch electrodes RE of the touch sensing unit 500 may not be able to be driven.

However, according to some embodiments described in association with FIG. 20, the second touch signal lines TL21 to TL2p and the third touch signal lines RL1 to RLq are formed in a double structure of a transparent conductive oxide layer and an opaque metal conductive layer. Therefore, even if the opaque metal conductive layer is exposed without being covered by the second insulating film 520 because the second insulating film 520 is opened by the fragment of the second substrate SUB2, conductivity may be maintained by the transparent conductive oxide layer. Therefore, it is possible to prevent some of the second touch electrodes RE of the touch sensing unit 500 from being disabled and not able to be driven.

Figure 21:
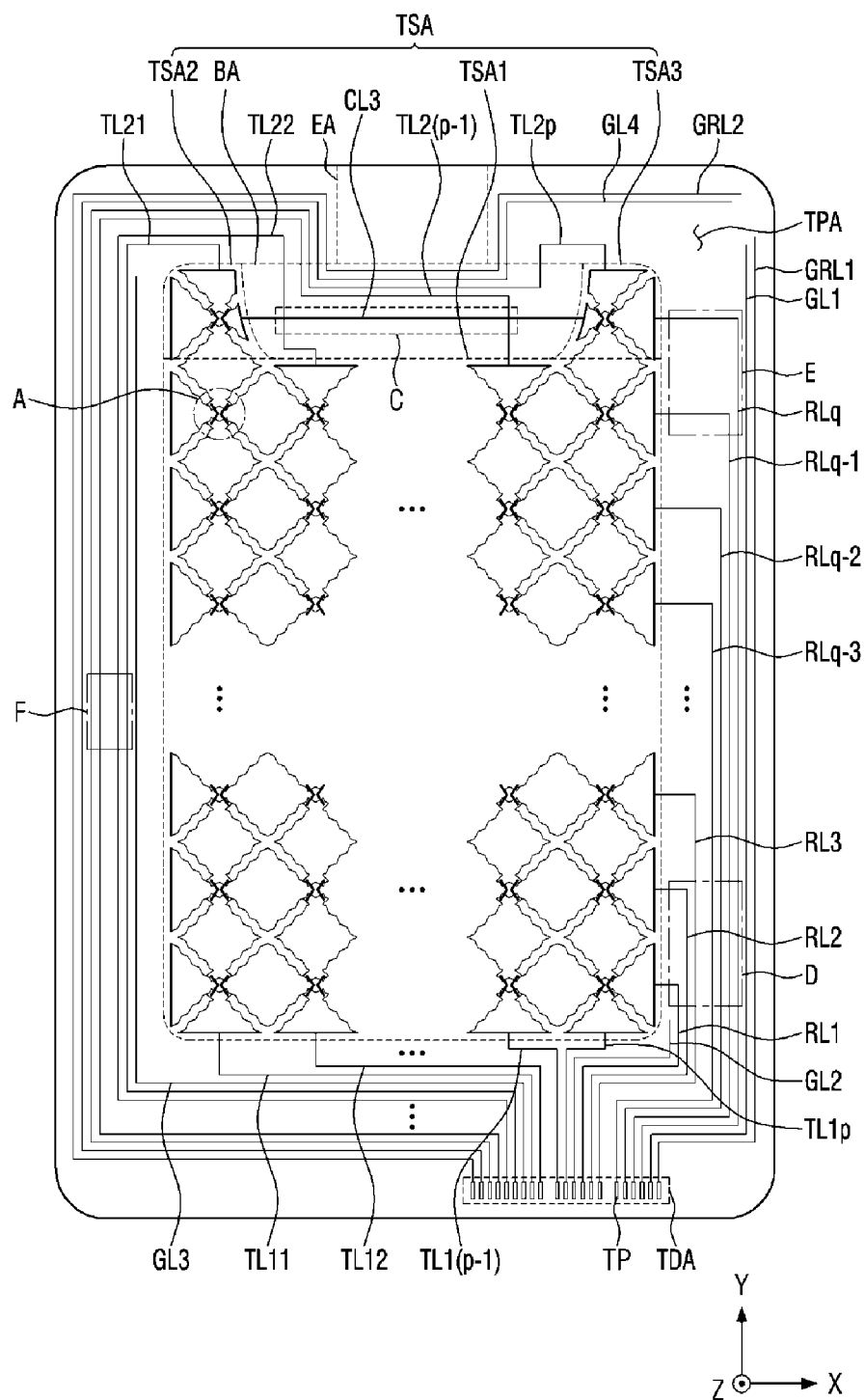
FIG. 21 is a plan view showing an example of the touch sensing unit of FIG. 5 according to some embodiments.

FIG. 21 is a plan view showing an example of the touch sensing unit of FIG. 5 according to some embodiments.

The embodiments described in association with FIG. 21 are different from the embodiments described in association with FIG. 5 in that the second touch signal lines TL21 to TL2p are not branched from the first touch signal lines TL11 to TL1p. As such, a description overlapping that of the embodiments of FIG. 5 will be omitted.

Referring to FIG. 21, the second touch signal lines TL21 to TL2p may be connected to the touch electrode pads TP of the touch pad area TDA. The second touch signal lines TL21 to TL2p may not intersect the first touch signal lines TL11 to TL1p. Therefore, the first touch signal lines TL11 to TL1p and the second touch signal lines TL21 to TL2p may be disposed on the same layer as the connection electrodes CE.

Since the areas A, C, D, E, and F shown in FIG. 21 are substantially the same as those described in FIGS. 6, 7, 12 to 17, and 20, a detailed description thereof will be omitted.

Figure 22:
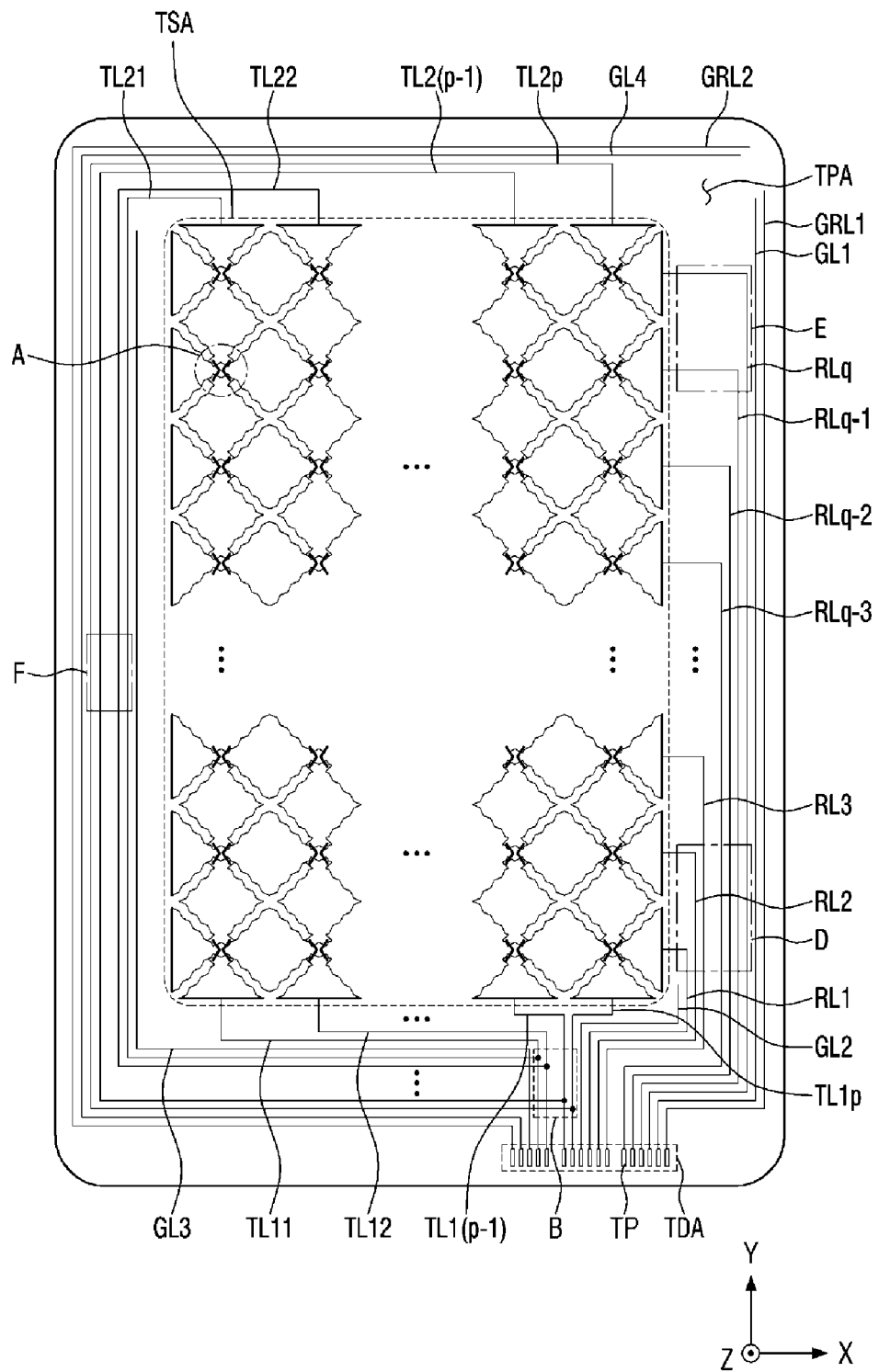
FIG. 22 is a plan view showing another example of the touch sensing unit of FIG. 5 according to some embodiments.

FIG. 22 is a plan view showing another example of the touch sensing unit of FIG. 5 according to some embodiments.

The embodiments described in association with FIG. 22 are different from the embodiments described in association with FIG. 5 in that the touch sensor area TSA does not include the second touch sensor area TSA2 protruding from one side of the first touch sensor area TSA1 and the third touch sensor area TSA3 protruding from the other side of the first touch sensor area TSA1. Therefore, a description overlapping that of the embodiments described in association with FIG. 5 will be omitted.

Referring to FIG. 22, the touch sensor area TSA may not include the second touch sensor area TSA2 protruding from one side of the first touch sensor area TSA1, and the third touch sensor area TSA3 protruding from the other side of the first touch sensor area TSA1. As such, the touch sensor area TSA may not include a recessed area RA having a shape in which the center of one side thereof is recessed, and the touch sensing unit 500 may not include a third connection line CL3 for connecting the second touch electrode RE of the second touch sensor area TSA2 to the second touch electrode RE of the third touch sensor area TSA3.

Since the areas A, B, D, E, and F shown in FIG. 22 are substantially the same as those described in association with FIGS. 6 to 11 and 13 to 20, a detailed description thereof will be omitted.

Figure 23:
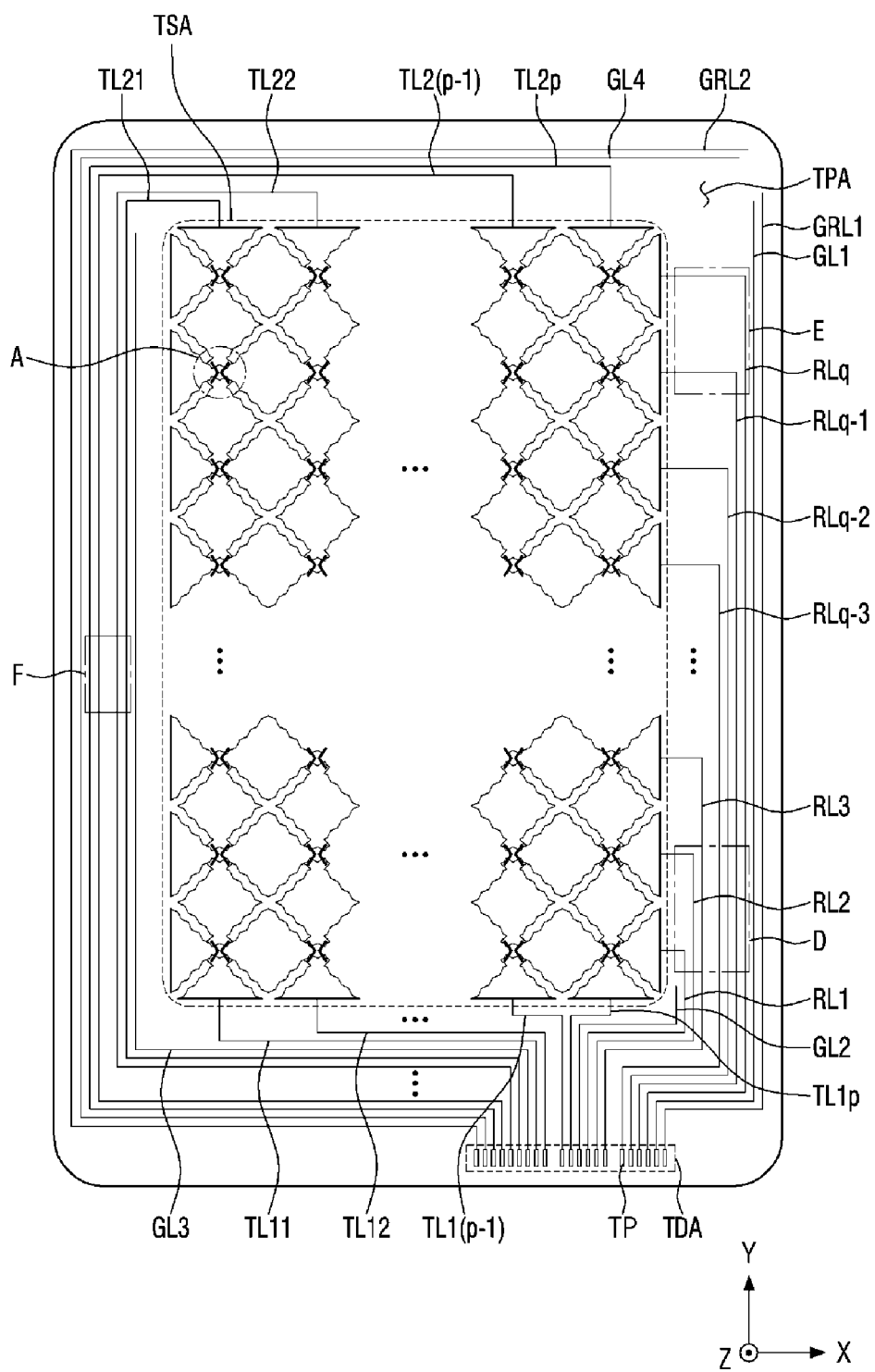
FIG. 23 is a plan view showing another example of the touch sensing unit of FIG. 5 according to some embodiments.

FIG. 23 is a plan view showing another example of the touch sensing unit of FIG. 5 according to some embodiments.

The embodiments described in association with FIG. 23 is different from the embodiments described in association with FIG. 5 in that that the second touch signal lines TL21 to TL2p are not branched from the first touch signal lines TL11 to TL1p, and in that the touch sensor area TSA does not include the second touch sensor area TSA2 protruding from one side of the first touch sensor area TSA1, and the third touch sensor area TSA3 protruding from the other side of the first touch sensor area TSA1. Therefore, a description overlapping the embodiments described in association with FIG. 5 will be omitted.

Referring to FIG. 23, the second touch signal lines TL21 to TL2p may be connected to the touch electrode pads TP of the touch pad area TDA. The second touch signal lines TL21 to TL2p may not intersect the first touch signal lines TL11 to TL1p. Therefore, the first touch signal lines TL11 to TL1p and the second touch signal lines TL21 to TL2p may be disposed on the same layer as the connection electrodes CE.

Further, the touch sensor area TSA may not include the second touch sensor area TSA2 protruding from one side of the first touch sensor area TSA1, and the third touch sensor area TSA3 protruding from the other side of the first touch sensor area TSA1. Thus, the touch sensor area TSA may not include a recessed area RA having a shape in which the center of one side thereof is recessed, and the touch sensing unit 500 may not include a third connection line CL3 for connecting the second touch electrode RE of the second touch sensor area TSA2 to the second touch electrode RE of the third touch sensor area TSA3.

Since the areas A, D, E, and F shown in FIG. 23 are substantially the same as those described in FIGS. 6, 7, 11 and 17, and 20, a detailed description thereof will be omitted.

Figure 24:
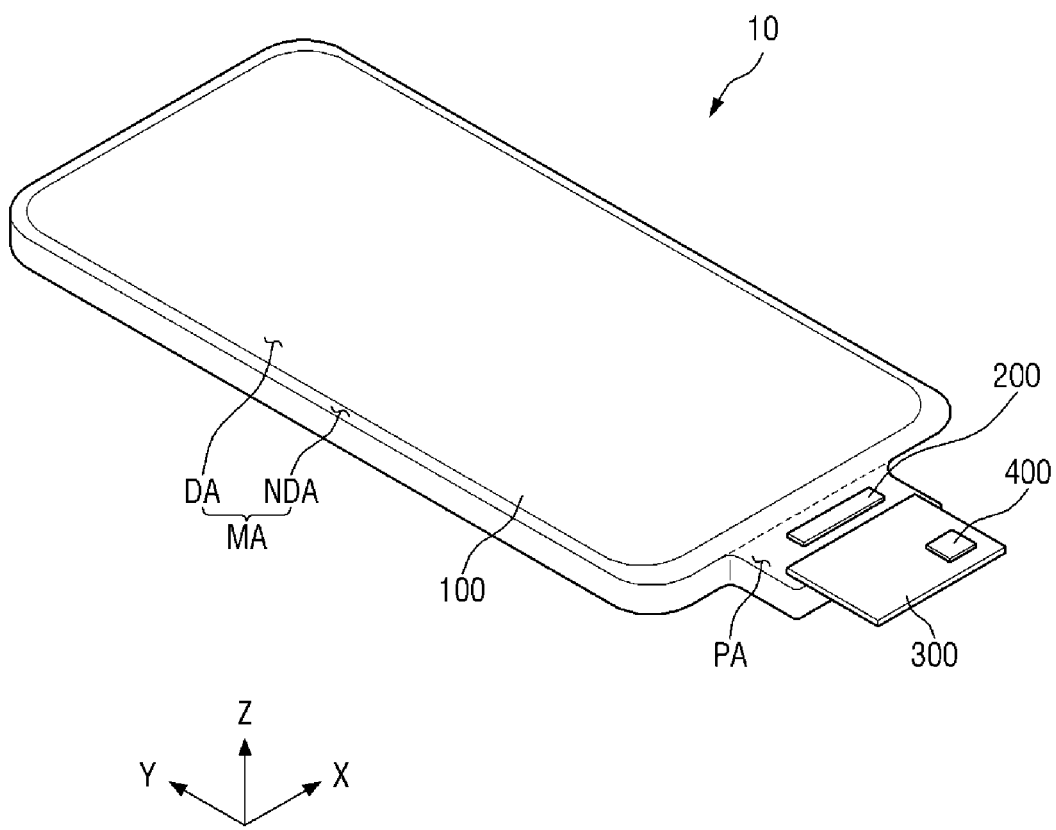
FIG. 24 is a perspective view of another display device according to some embodiments.
Figure 25:
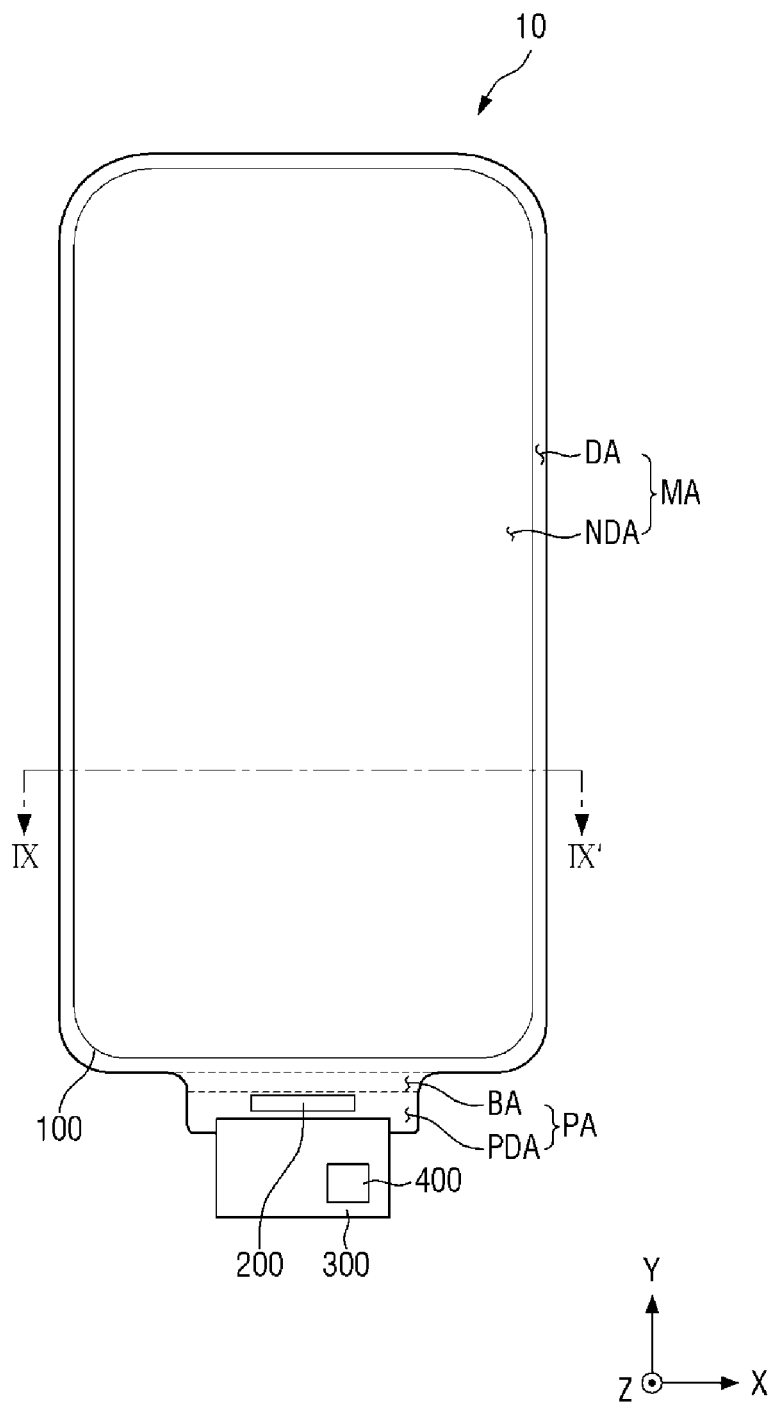
FIG. 25 is a plan view of another display device according to some embodiments.

FIG. 24 is a perspective view of another display device according to some embodiments. FIG. 25 is a plan view of another display device according to some embodiments.

The embodiments described in association with FIGS. 24 and 25 are different from the embodiments described in association with FIGS. 1 and 2 in that a display panel 100 includes a main area MA and a protrusion area PA protruding from the main area MA. Therefore, a description overlapping that of the embodiments described in association with FIGS. 1 and 2 will be omitted.

Referring to FIGS. 24 and 25, a display device 10 according to some embodiments includes a display panel 100, a display driving circuit 200, a display circuit board 300, and a touch driving circuit 400.

The display panel 100 includes a main area MA and a protrusion area PA protruding from one side of the main area MA.

The main area MA may have a rectangular planar shape having short sides in the first direction (X-axis direction) and long sides in the second direction (Y-axis direction). The corner where the short side in the first direction (X-axis direction) meets the long side in the second direction (Y-axis direction) may be formed to have a round shape of a predetermined curvature or have a right angle shape, or some other geometric configuration. The planar shape of the display panel 100 is not limited to a rectangular shape, and may be formed in another polygonal shape, circular shape, or elliptical shape. The main area MA may be formed flat, but is not limited thereto, and may include a curved portion formed at, for instance, left and right ends. In this case, the curved portion may have a constant curvature or a variable curvature.

The main area MA may include a display area DA where pixels are formed to display an image, and a non-display area NDA, which is outside (e.g., a peripheral area) of the display area DA.

In the display area DA, not only pixels but also scan lines, data lines, and power supply lines, which are connected to the pixels, may be arranged. When the main area MA includes the curved portion, the display area DA may be disposed in the curved portion. In this case, the image of the display panel 100 may also be seen even on the curved portion.

The non-display area NDA may be defined as an area from the outside of the display area DA to the edge of the display panel 100. In the non-display area NDA, a scan driving unit for applying scan signals to scan lines and link lines for connecting data lines to the display driving circuit 200 may be arranged.

The protrusion area PA may protrude from one side of the main area MA. For example, the protrusion area PA may protrude from the lower side of the main area MA as shown in FIGS. 24 and 25. The length of the protrusion area PA in the second direction (Y-axis direction) may be shorter than the length of the main area MA in the first direction (X-axis direction), or vice versa.

The protrusion area PA may include a bending area BA and a pad area PDA. In this case, the pad area PDA may be disposed at one side of the bending area BA, and the main area MA may be disposed at the other side of the bending area BA. For example, the pad area PDA may be disposed at the lower side of the bending area BA, and the main area MA may be disposed at the upper side of the bending area BA.

The display panel 100 may be formed to be flexible such that it is (or can be) intentionally bent, unbent, warped, unwarped, folded, unfolded, rolled, and/or unrolled. As such, the display panel 100 may be bent from the bending area BA in the thickness direction (Z-axis direction). In this case, one side of the pad area PDA of the display panel 100 faces upward before the display panel 100 is bent, but one side of the pad area PDA of the display panel 100 faces downward after the display panel 100 is bent. Thus, since the pad area PDA is disposed under the main area MA, the pad area PDA may overlap the main area MA.

The pad area PDA of the display panel 100 may be provided with pads electrically connected to the display driving circuit 200 and the display circuit board 300. The pads may include display pads electrically connected to the display driving circuit 200 and touch pads electrically connected to the touch lines.

The touch driving circuit 400 may be disposed on the display circuit board 300. The touch driving circuit 400 may be formed of an integrated circuit (IC) and mounted on the display circuit board 300.

Figure 26:
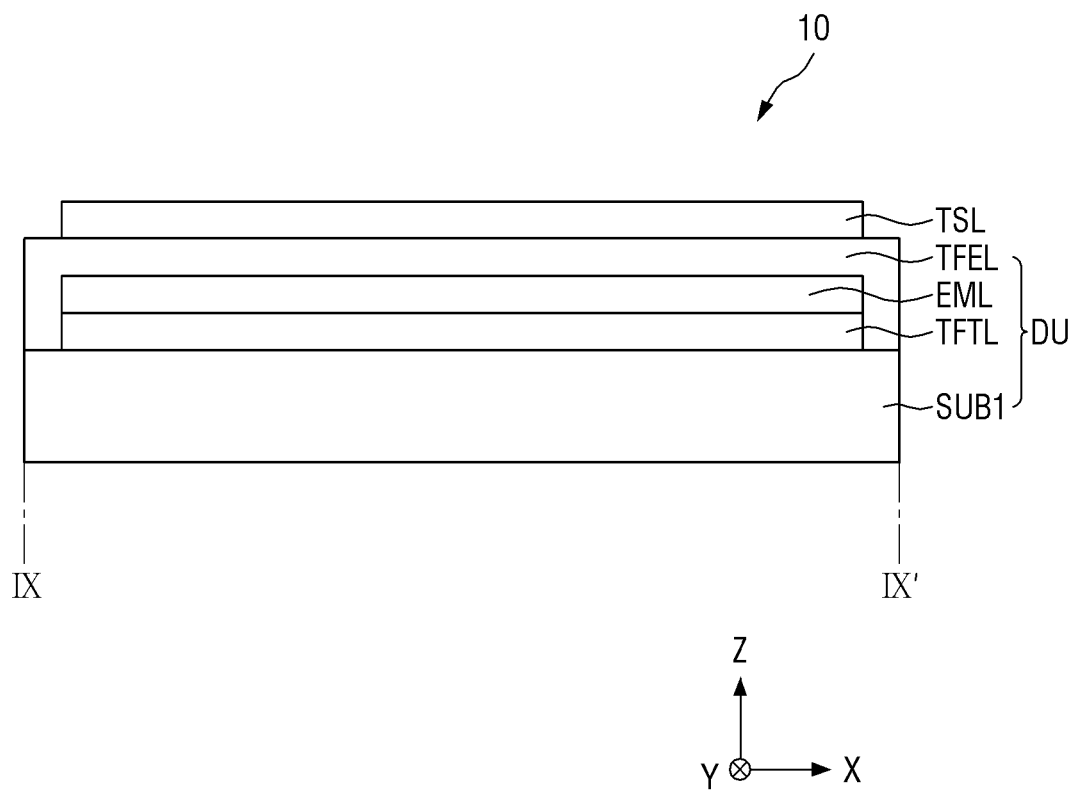
FIG. 26 is an example of a cross-sectional view taken along sectional line IX-IX' of FIG. according to some embodiments.

FIG. 26 is an example of a cross-sectional view taken along sectional line IX-IX' of FIG. according to some embodiments.

The embodiments described in association with FIG. 26 are different from the embodiments described in association with FIG. 3 in that the second substrate SUB2 is emitted, and the touch sensor layer TSL is disposed on a thin film encapsulation layer TFEL. Therefore, a description overlapping that of the embodiments described in association with FIG. 3 will be omitted.

Referring to FIG. 26, the thin film encapsulation layer TFEL may be disposed in both the display area DA and the non-display area NDA. For instance, the thin film encapsulation layer TFEL may be disposed so as to cover the thin film transistor layer TFTL and the light emitting element layer EML in the display area DA and the non-display area NDA.

A touch sensor layer TSL may be disposed on the thin film encapsulation layer TFEL.

Since the touch sensor layer TSL may be disposed directly on such that the touch sensor layer TSL contacts the thin film encapsulation layer TFEL, there is an advantage that the thickness of the display device 10 can be reduced compared to when a separate touch panel including the touch sensor layer TSL is disposed on the thin film encapsulation layer TFEL.

Figure 27:
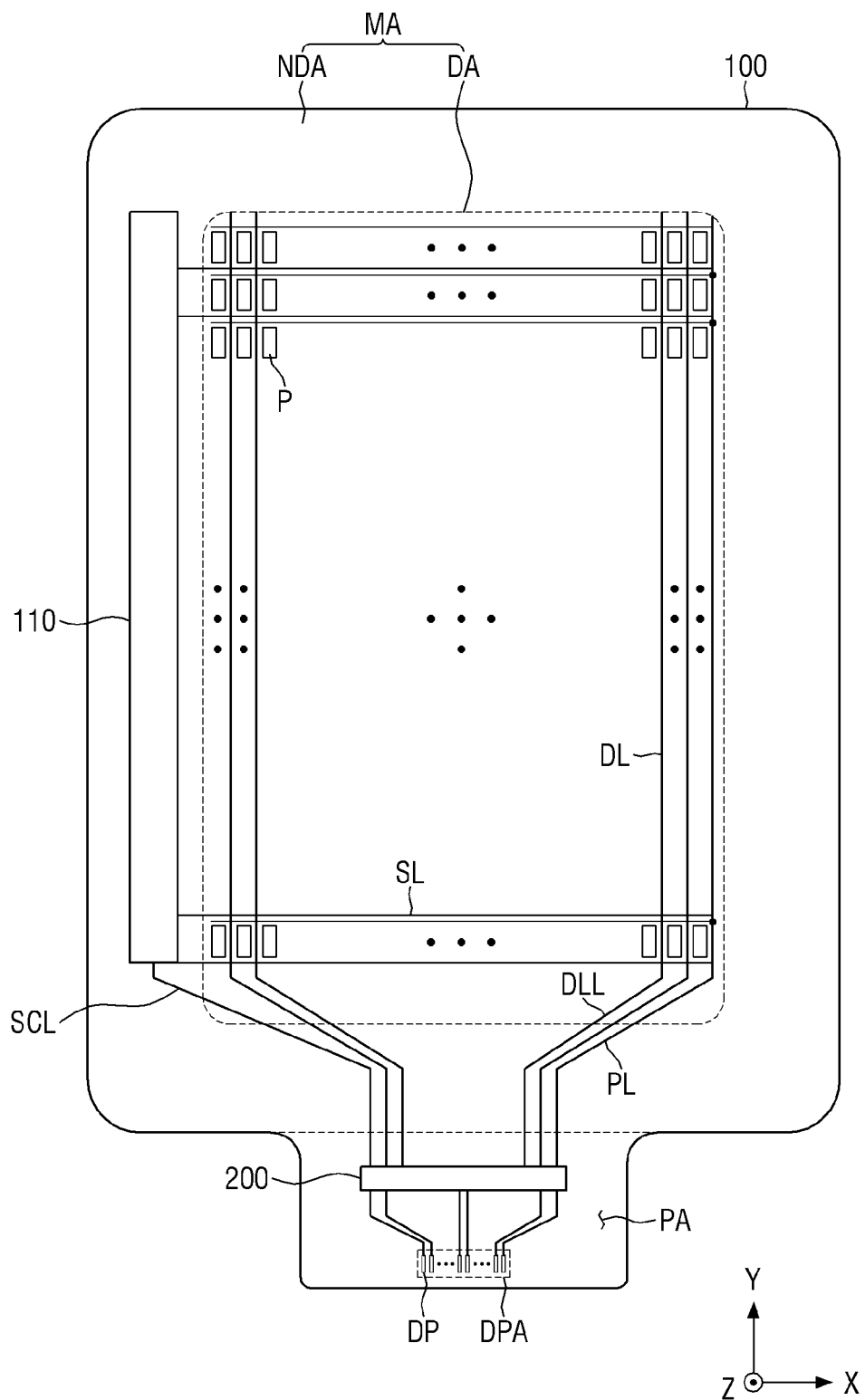
FIG. 27 is a plan view showing an example of the display unit of FIG. 26 according to some embodiments.
Figure 28:
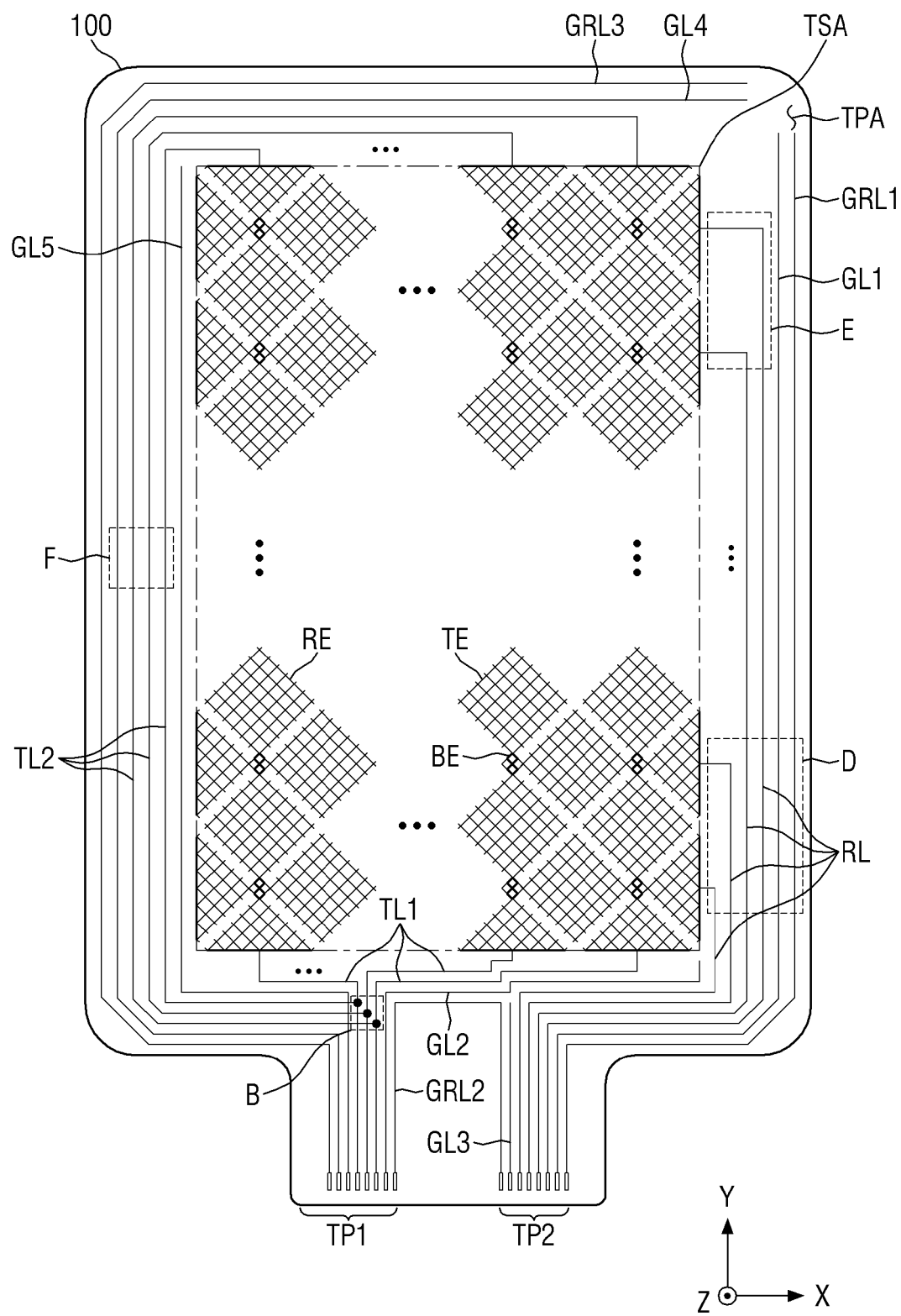
FIG. 28 is a plan view showing an example of the touch sensing unit of FIG. 26 according to some embodiments.

FIG. 27 is a plan view showing an example of the display unit of FIG. 26 according to some embodiments. FIG. 28 is a plan view showing an example of the touch sensing unit of FIG. 26 according to some embodiments.

The embodiments described in association with FIGS. 27 and 28 are different from the embodiments described in association with FIGS. 4 and 5 in that display electrode pads DP and touch electrode pads TP1 and TP2 are disposed in the pad area PDA of the protrusion area PA of the display panel 100, and touch electrodes TE and RE are formed in a mesh shape. Also, the touch sensor area TSA does not include the second touch sensor area TSA2 protruding from one side of the first touch sensor area TSA1 and the third touch sensor area TSA3 protruding from the other side of the first touch sensor area TSA1. In this manner, the touch sensor area TSA may not include a recessed area RA having a shape in which the center of one side thereof is recessed, and the touch sensing layer TSL may not include a third connection line CL3 for connecting the second touch electrode RE of the second touch sensor area TSA2 to the second touch electrode RE of the third touch sensor area TSA3. Thus, a description overlapping that of the embodiments described in association with FIGS. 4 and 5 will be omitted.

Referring to FIGS. 27 and 28, the display electrode pads DP may be disposed at one end of the protrusion area PA of the display panel 100. The first touch electrode pads TP1 may be disposed at the left side of the display electrode pads DP, and the second touch electrode pads TP2 may be disposed at the right side of the display electrode pads DP.

The driving electrodes TE and the sensing electrodes RE may be formed as mesh-shaped electrodes as shown in FIG. 28. When the touch sensor layer TSL including the driving electrodes TE and the sensing electrodes RE is formed directly on the thin film encapsulation layer TFEL as shown in FIG. 26, since the distance between the second electrode of the light emitting element layer EML and the driving electrodes TE or sensing electrodes RE of the touch sensor layer TSL is close, a parasitic capacitance may be formed greatly between the second electrode of the light emitting element layer EML and the driving electrode TE or sensing electrode RE of the touch sensor layer TSL. Therefore, to reduce the parasitic capacitance, the driving electrodes TE and the sensing electrodes RE may be formed as mesh-shaped electrodes as shown in FIG. 28, rather than being formed as non-patterned electrodes of a transparent oxide conductive layer, such as ITO or IZO.

Since the areas B, D, E, and F shown in FIG. 28 are substantially the same as those described in association with FIGS. 8, 9, 13 to 17, and 20, a detailed description thereof will be omitted.

According to various embodiments, a touch sensing unit and a display device including the same may include second touch signal lines branched from first touch signal lines, and touch driving signals can be applied to the first touch electrodes disposed at first and second sides of the touch sensor area using the first touch signal lines and the second touch signal lines. Therefore, the touch driving signals can be stably applied to the first touch electrodes.

Further, according to various embodiments, a touch sensing unit and a display device including the same may include the touch signal lines formed to have a double structure of a transparent conductive oxide layer and an opaque metal conductive layer. As such, even if the opaque metal conductive layer is exposed without being covered by a second insulating film because the second insulating film is opened by a fragment of the second substrate when a scribing process is performed, conductivity may be maintained by the transparent conductive oxide layer. Therefore, it is possible to prevent some of the second touch electrodes RE of the touch sensing unit from being disabled from being driven.

It is noted, however, that the effects of the inventive concepts are not limited by the foregoing, and other various effects are anticipated herein.

Although certain embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device, comprising:
a display unit configured to display an image, and comprising a plurality of scan lines connected to a plurality of pixels, respectively, for supplying scan signals; and
a touch sensing unit configured to sense a touch, and comprising:
  first and second touch electrodes disposed in a first touch sensor area, a second touch sensor area protruding from one side of the first touch sensor area in a first direction, and a third touch sensor area protruding from the one side of the first touch sensor area in the first direction, wherein the first touch electrodes are disposed in the first direction in each of a plurality of columns, and the second touch electrodes are disposed in a second direction intersecting the first direction in each of a plurality of rows;
  a first connection line connected to a second touch electrode of the second touch sensor area and a second touch electrode of the third touch sensor area from among the second touch electrodes;
  a plurality of touch driving lines electrically connected to the first touch electrodes, and configured to receive a plurality of touch driving pulses; and
  a plurality of touch sensing lines electrically connected to the second touch electrodes,
  wherein the plurality of touch sensing lines are configured to sense charge amounts of mutual capacitances between the first and second touch electrodes, and a touch sensing line connected to at least one of the second touch electrode of the second touch sensor area or the second touch electrode of the third touch sensor area from among the plurality of touch sensing lines is configured to sense the charge amounts transferred by the first connection line between the second touch electrode of the second touch sensor area and the second touch electrode of the third touch sensor area.

2. The display device of claim 1, wherein an area is between the second touch sensor area and the third touch sensor area in the second direction.

3. The display device of claim 2, wherein the first touch sensor area is larger than an area of the second touch sensor area, and
wherein the first touch sensor area is larger than an area of the third touch sensor area.

4. The display device of claim 2, wherein the first and second touch electrodes are not disposed in the area.

5. The display device of claim 2, wherein the first connection line is disposed in the area between the second touch sensor area and the third touch sensor area.

6. The display device of claim 1, wherein the second touch electrode of the second touch sensor area is adjacent to a first side of the second touch sensor area which is opposite to the third touch sensor area in the second direction, and
wherein the second touch electrode of the third touch sensor area is adjacent to a first side of the third touch sensor area which is opposite to the second touch sensor area in the second direction.

7. The display device of claim 1, wherein the first connection line is disposed in a different layer from the first touch electrodes and the second touch electrodes.

8. The display device of claim 1, wherein the touch sensing unit further comprises:
first touch signal lines connected to the first touch electrodes disposed at one side of the columns, respectively; and
second touch signal lines connected to the second touch electrodes disposed at one side of the rows, respectively.

9. The display device of claim 8, wherein the first connection line is disposed on a same layer as the first touch signal lines and second touch signal lines.

10. The display device of claim 8, wherein the touch sensing unit further comprises:
a substrate on which the first touch signal lines, the second touch signal lines, and the first connection line are disposed; and
a first insulating film disposed on the first touch signal lines, the second touch signal lines, and the first connection line,
wherein the first touch electrodes and the second touch electrodes are disposed on the first insulating film.

11. The display device of claim 8, wherein maximum widths of the second touch signal lines are different from each other.

12. The display device of claim 8, wherein maximum widths of the second touch signal lines decrease as the second touch signal lines become closer to the first touch sensor area.

13. The display device of claim 8, wherein a first maximum width of a first sub touch line adjacent to the first touch sensor area among the second touch signal lines is smaller than a second maximum width of a second sub touch line adjacent to an edge of a substrate among the second touch signal lines.

14. The display device of claim 13, wherein a length of the first sub touch line is longer than a length of the second sub touch line.

15. The display device of claim 13, wherein a third maximum width of a third sub touch line between the first sub touch line and the second sub touch line in the second direction is greater than the first maximum width and less than the second maximum width.

16. The display device of claim 15, wherein a length of the third sub touch line is longer than a length of the first sub touch line and less than a length of the second sub touch line.

17. The display device of claim 8, wherein the touch sensing unit further comprises:
a guard line between the first touch sensor area and a first sub touch line adjacent to the first touch sensor area among the second touch signal lines.

18. The display device of claim 17, wherein the guard line is between the first sub touch line and one of the first touch signal lines.

19. The display device of claim 17, wherein a ground voltage is applied to the guard line.

20. The display device of claim 1, wherein the second touch sensor area protrudes from one edge of one side of the first touch sensor area, and the third touch sensor area protrudes from an another edge of the one side of the first touch sensor area.

* * * * *